United States Patent [19]

Machida

[11] Patent Number: 5,848,302
[45] Date of Patent: Dec. 8, 1998

[54] MULTI-MOTOR CAMERA FOR NORMAL AND TRIMMING PHOTOGRAPHY HAVING VARIABLE FOCAL LENGTH PHOTOGRAPHING LENS AND FINDER AND VARIABLE ILLUMINATING ANGLE FLASH DEVICE

[75] Inventor: Kiyosada Machida, Urawa, Japan

[73] Assignee: Nikon Corporation, Tokyo, Japan

[21] Appl. No.: 909,305

[22] Filed: Aug. 11, 1997

Related U.S. Application Data

[62] Division of Ser. No. 650,765, May 20, 1996, abandoned, which is a division of Ser. No. 540,155, Oct. 6, 1995, Pat. No. 5,543,875, which is a continuation of Ser. No. 309,787, Sep. 21, 1994, abandoned, which is a continuation of Ser. No. 847,272, Mar. 10, 1992, abandoned.

[30] Foreign Application Priority Data

| Mar. 14, 1991 | [JP] | Japan | 3-074623 |
| Mar. 14, 1991 | [JP] | Japan | 3-074624 |
| Mar. 14, 1991 | [JP] | Japan | 3-074625 |
| Mar. 14, 1991 | [JP] | Japan | 3-074626 |
| Mar. 20, 1991 | [JP] | Japan | 3-081807 |

[51] Int. Cl.$^6$ ................................................. G03B 13/10
[52] U.S. Cl. ................................ 396/60; 396/85; 396/379
[58] Field of Search .............................. 396/60, 72, 76, 396/85, 373, 379

[56] References Cited

U.S. PATENT DOCUMENTS

| 4,609,269 | 9/1986 | Kamata | 396/62 |
| 5,119,122 | 6/1992 | Kudo et al. | 396/60 |

*Primary Examiner*—Safet Metjahic
*Assistant Examiner*—J. K. Han
*Attorney, Agent, or Firm*—Shapiro and Shapiro

[57] ABSTRACT

A camera having selectable normal and trimming photographing modes and a photographing zoom lens, has a control system, including a zooming motor for driving the zoom lens, operable to set a desired focal length in response to the actuation of a control element. When a desired focal length is within the normal zooming range of the zoom lens, the normal photographing mode is selected and the zoom lens is driven to the desired focal length in response to actuation of the control element. When the desired focal length is greater than the focal length at the telephoto end of the zoom lens, the trimming photographing mode is selected, and the zoom lens is driven to the telephoto end, is then driven toward the wide angle end to a predetermined focal length at which a product of the predetermined focal length and a predetermined trimming magnification is equal to the focal length at the telephoto end, and is then again driven toward the telephoto end to a further focal length at which the product of the further focal length and the predetermined trimming magnification is equal to the desired focal length.

3 Claims, 15 Drawing Sheets

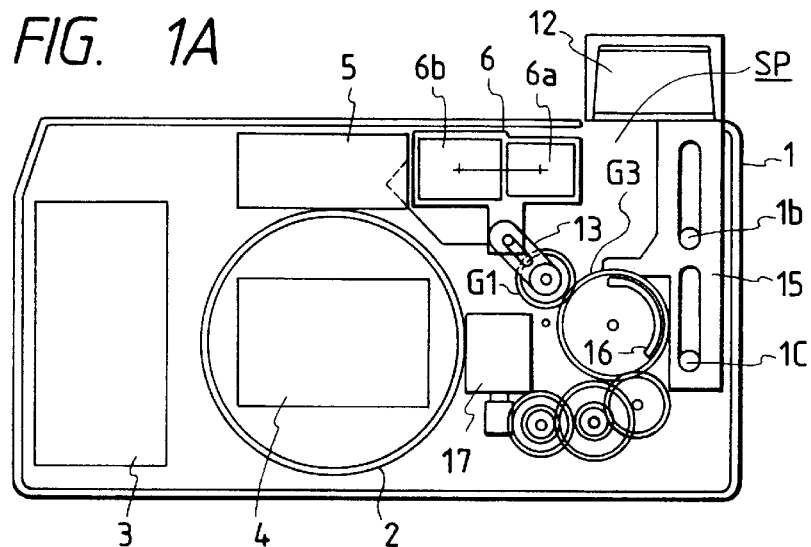
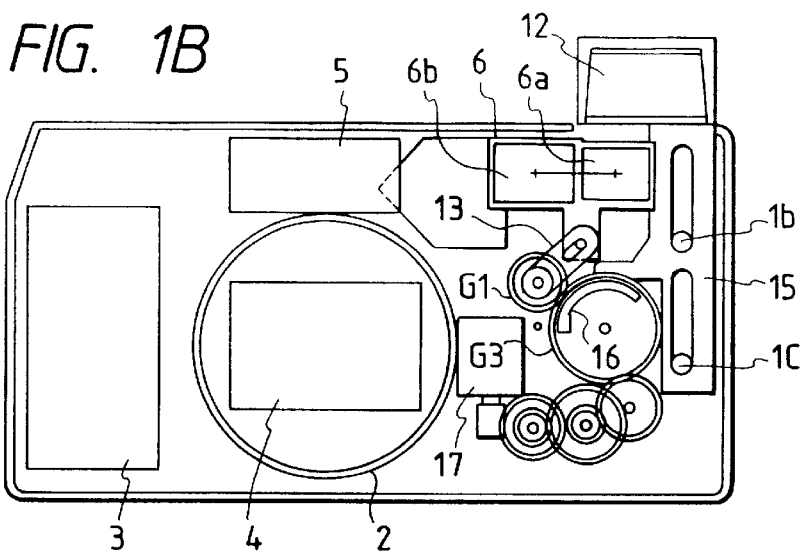
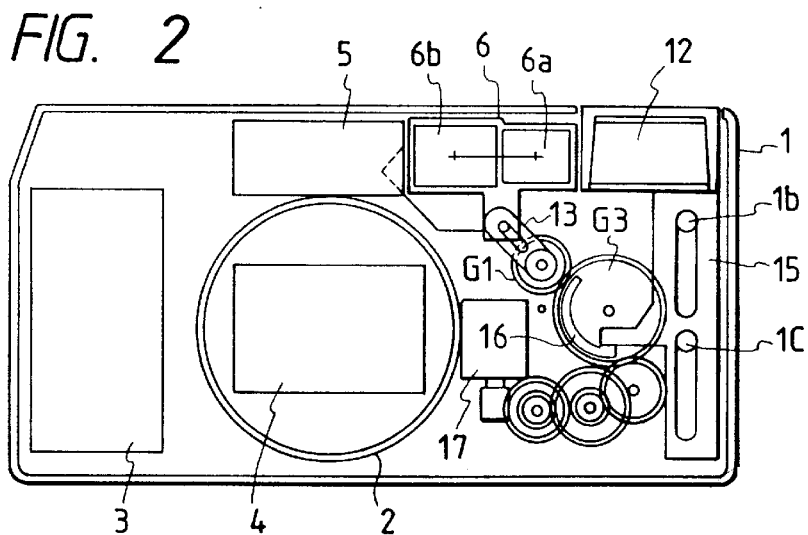

MULTI-MOTOR CAMERA FOR NORMAL AND TRIMMING PHOTOGRAPHY HAVING VARIABLE FOCAL LENGTH PHOTOGRAPHING LENS AND FINDER AND VARIABLE ILLUMINATING ANGLE FLASH DEVICE

This is a division of application Ser. No. 08/650,765 filed May 20, 1996, now abandoned, which is a division of application Ser. No. 08/540,155 filed Oct. 6, 1995 (now U.S. Pat. No. 5,543,875), which is a continuation of application Ser. No. 08/309,787 filed Sep. 21, 1994 (abandoned), which is a continuation of application Ser. No. 07/847,272 filed Mar. 10, 1992 (abandoned).

BACKGROUND OF THE INVENTION

1. Field of the Invention

The present invention relates to a camera capable of taking photographs with at least two kinds of photographing angles of view.

2. Related Background Art

For example, a camera having a bifocal lens settable at two focal lengths and capable of taking photographs with two kinds of photographing angles of view has been known, wherein the finder magnification can be altered in accordance with the focal length (angle of view) as above mentioned by inserting or retracting a conversion lens into or from an optical path of a finder.

However, with such a camera, it is necessary to have a space for retracting the conversion lens within a main body of camera, and particularly with a camera containing an electronic flash device, it is necessary to reserve a space for retracting the conversion lens, in addition to an allocation space for the electronic flash device, whereby there is a problem that the camera is obliged to be larger.

Conventionally, for example, bifocal lens cameras having finder magnification varying mechanisms have been well known, and are constituted in the following way.

A converter lens block containing a tele-converter lens and a wide converter lens is disposed in front of a finder optical unit, in which the finder magnification can be altered by switching the converter lens block to the left or right so that the tele-converter lens or the wide converter lens is positioned in the optical path of the finder optical unit for a taking lens of a long focus or a short focus, respectively.

On the other hand, the bifocal lens camera of this kind containing a strobe is known. Typically, a lighting portion for such a built-in strobe (thereinafter referred to as a strobe unit) is of a rectangular parallelepiped shape, and disposed sideway of the finder with its longitudinal direction placed in a horizontal direction of the camera.

However, when a strobe is contained within such a conventional camera with variable finder magnification, the camera tends to be larger because the longitudinal direction of the strobe unit coincides with a switching direction of the converter lens block.

Trimming photography is one in which the information (trimming information) of printing only a predetermined area (trimming area) of exposure area formed on a film by a shutter release is recorded, for example, on a blank portion of the film. This trimming information is read on the laboratory side, and the trimming area is only enlarged and printed on the basis of that information. As the trimming area is smaller than the print area in the normal photography, the trimming photography allows a picture equivalent to that by the zooming to be taken even with a single focal lens.

By the way, when setting the trimming photographing mode for the trimming photography, it is necessary to change the finder magnification in accordance with the trimming area. Also, when the electronic flash device is used, its illuminating angle is advantageously set to be smaller in accordance with a trimming screen than in the normal photography. This is because the light quantity (guide number) increases with smaller illuminating angle, so that the flash photographing of an object located farther away is allowed. And the alteration of finder magnification and illuminating angle can be made by bringing the conversion lens into or out of the optical path of the finder, and disposing an illuminating angle altering member such as a diffusion plate in a front face of the lighting portion of the electronic flash device.

There is also known a camera capable of the trimming photography as above described and having a zoom lens for photography, wherein the angle of view is allowed as in the following way. That is, this camera is such that when the alteration of the angle of view is instructed within a range of settable focal length for the zooming lens for photography, the normal photographing mode is set, and the zoom lens for photography is set to a focal length corresponding to an instructed angle of view by driving a zooming motor. Also, when the alteration of the angle of view is instructed to a larger angle beyond the settable focal length range, the trimming photographing mode is set, and the zoom lens for photography is set to a focal length corresponding to an instructed angle of view by driving the zooming motor.

According to this, for example, when there is provided a zoom lens whose focal length is variable in a range from 35 mm to 70 mm, assuming that the trimming magnification is 1.7, the equivalent focal length corresponding to 35 mm to 120 mm, i.e., the angle of view, can be obtained. From this reason, with such camera, it is desirable to use a zoom finder allowing for the finder magnification corresponding to 35 mm to 120 mm.

There is no problem when the angle of view is changed within a range of settable focal length (e.g., 35 mm to 70 mm) in the zoom lens for photography, but when the angle of view is continuously altered to a larger angle exceeding the settable range in a state where the angle of view is set in that range, it is necessary to set the trimming photographing mode and zoom down the focal length for the zoom lens for photography to a predetermined value, when the focal length of the zoom lens for photography reaches 70 mm. Therefore, the alteration of the angle of view is not continuous by the time required to zoom down the focal length. Therefore, if the alteration of finder magnification is performed in connection with the zooming of the taking lens, it takes some time to reach a finder magnification corresponding to a desired angle of view, and there is a fear that photo opportunity is lost. Also, in this case, a finder converter lens for the trimming is necessary, and the size of a finder image becomes discontinuous in exchanging the converter.

In switching the finder magnification and the illuminating angle for the electronic flash device by the use of motor, if dedicated motors are provided, the camera is larger and the cost is higher.

Conventionally, various kinds of cameras having so-called zoom-type finders (thereinafter referred to as zoom finder) have been proposed in which the finder magnification is varied in accordance with the focal length of a taking lens by moving a variable magnification lens of the finder in its optical axis direction upon the zooming (alteration of image magnification) of the taking lens (zoom lens). Also, cameras containing so-called zoom-type flash devices (thereinafter referred to as zoom strobe) have been proposed in which the distance between the lighting portion of the electronic flash device and a condenser lens is varied by driving the lighting portion in its optical axis direction upon the zooming of the taking lens so as to obtain the illuminating angle corresponding to the focal length of the taking lens.

On the other hand, in cameras capable of the trimming photography as above described, the image magnification is altered in switching the normal photographing mode to the trimming photographing mode as the trimming region is smaller than the print region in the normal photography, whereby it is necessary to alter the finder magnification and the illuminating angle of the electronic flash device upon the switching.

However, in the above-mentioned cameras having the zoom lenses and capable of the trimming photography, as the image magnification is altered with either of the zooming of zoom lens and the switching of the photographing mode, there is a problem that in addition to the complex constitution and the larger camera, it takes some time to change the finder magnification and the illuminating angle, if proper finder magnification and illuminating angle are settable only with the zooming of the zoom finder and the zoom strobe as above described.

SUMMARY OF THE INVENTION

An object of the present invention is to provide a camera capable of taking photographs at a plurality of angles of view with the size of camera suppressed to the minimum.

Another object of the present invention is to provide a strobe built-in camera with variable finder magnification and in a smaller size.

A further object of the present invention is to provide a camera capable of the trimming photography with less chance of losing a photo opportunity.

A further object of the present invention is to provide a camera capable of the trimming photography wherein the finder magnification and the illuminating angle adapted for each photographing mode (normal photographing mode, trimming photographing mode) can be obtained without incurring a larger camera and a higher cost.

A further object of the present invention is to provide a camera capable of the trimming photography wherein the finder magnification and the illuminating angle can be promptly set in accordance with the photographing mode and the focal length of the taking lens upon the switching of the photographing mode without making the camera larger.

The present invention is applied to a camera having an electronic flash device and capable of taking photographs with at least two kinds of angles of view, wherein the finder magnification can be altered in accordance with the angle of view by moving a conversion lens into or out of an optical path of the finder. And the lighting portion of the electronic flash device is switchable between a projecting position where it projects from a camera body and a stored position where it is stored within the camera body, and when the lighting portion is switched to the projecting position, the conversion lens is retracted into a space of the camera body formed, whereby the above-mentioned object can be accomplished.

If the lighting portion of electronic flash device is switched to the projecting position, the space is formed within the camera body, and the conversion lens is retracted within this space. With such a constitution, the size of the camera can be suppressed to the minimum.

The present invention is applicable to a camera with variable finder magnification, comprising a taking lens having a plurality of focal lengths settable, a finder having a converter lens block containing a finder optical unit and a plurality of converter lenses corresponding to a plurality of focal lengths and movable in front of the finder optical unit, magnification altering means for switching the converter lens block so that any one of the converter lenses is located on an optical axis of the finder optical unit, in order to change the magnification of an object, and a strobe unit of a substantially rectangular parallelepiped shape adjoining a switching end of the converter lens block.

And the strobe unit is disposed so that the longitudinal direction of the strobe unit may be substantially perpendicular to a switching direction of the converter lens block, whereby the above-mentioned object can be accomplished.

The longitudinal direction of the strobe unit is substantially perpendicular to the switching direction of the converter lens block. Accordingly, the camera can be made smaller by the amount of (length of long side minus that of short side) than if the longitudinal direction is oriented in the switching direction of the converter lens block.

The present invention is applicable to a camera comprising a finder and an electronic flash device and capable of switching between the normal photographing mode and the trimming photographing mode. And the above-mentioned problem can be solved by providing a conversion lens insertable into an optical path of the finder to alter the finder magnification, an illuminating angle altering member insertable into a front plane on a lighting portion of the electronic flash device to alter the illuminating angle of the lighting portion, a motor driven in a predetermined direction in response to an instruction for switching between the normal photographing mode and the trimming photographing mode, and a driving mechanism for setting the finder magnification corresponding to an instructed photographing mode and the illuminating angle corresponding to the instructed photographing mode, by driving the conversion lens with the rotation of the motor in one direction as above mentioned, along with the relative driving of the illuminating angle altering member and the lighting portion of the electronic flash device.

The camera capable of the trimming photography according to the present invention can accomplish the above-mentioned object by providing a zoom lens for photography whose focal length can be altered by a zooming motor, instructing means for instructing the alteration of the angle of view, driving control means for setting the zoom lens for photography to a focal length corresponding to an instructed angle of view by driving the zooming motor as well as setting the normal photographing mode when the alteration of angle of view is instructed within a range of settable focal length for the zoom lens for photography, or setting the zoom lens for photography to the focal length corresponding to the instructed angle of view by driving the zooming motor as well as setting the trimming photographing mode when the alteration of angle of view is instructed beyond the range of settable focal length, a zoom finder for permitting the finder magnification to be set in accordance with each angle of view by being zooming driven by a finder magnification altering motor separately provided from the zooming motor, and a finder zooming mechanism for zooming driving the zoom finder with the finder magnification altering motor so as to set the finder magnification corresponding to the instructed angle of view in response to the instruction for altering the angle of view.

If the switching between the normal photographing mode and the trimming photographing mode is instructed, the motor is driven, and the driving mechanism sets the finder magnification corresponding to an instructed photographing mode and the illuminating angle corresponding to the instructed photographing mode by driving the conversion lens in one direction of the motor with the relative driving of the illuminating angle altering member and the lighting portion of the electronic flash device. Thereby, the switching of the finder magnification and the illuminating angle can be made in a shorter time.

When the alteration of angle of view is instructed, the finder zooming mechanism zooming drives the zoom finder with the finder magnification altering motor separately provided from the zooming motor, and sets the finder magnification corresponding to the instructed angle of view. According to this, the finder zooming can be performed independently of the zooming for the zoom lens for photography, so that when the alteration for the angle of view is made beyond the range of settable focal length with the zoom lens for photography in a state where the angle of view is set within that range, the finder magnification corresponding to the angle of view can be obtained more rapidly than the angle of view. Accordingly, the composition adjustment can be made quickly, and a predetermined angle of view can be obtained when the composition is determined, so that the photographing can be made without losing a photo opportunity.

The present invention is applicable to a camera comprising a finder and an electronic flash device and capable of switching between the normal photographing mode and the trimming photographing mode. The above-mentioned object can be accomplished by providing a conversion lens insertable into an optical path of a finder to alter the finder magnification, an illuminating angle altering member insertable into a front plane on a lighting portion of the electronic flash device to alter the illuminating angle of the electronic flash unit, a single motor capable of rotating in both forward and reverse directions, a first driving mechanism for driving the conversion lens with the forward rotation of the motor, a second driving mechanism for driving the illuminating angle altering member with the reverse rotation of the motor, instructing means for instructing the switching between the normal photographing mode and the trimming photographing mode, and driving control means for driving the conversion lens via the first driving mechanism by forwardly rotating the motor to the finder magnification corresponding to the instructed photographing mode in response to a switching instruction, and driving the illuminating angle altering member via the second driving mechanism by reversely rotating the motor to the illuminating angle corresponding to the instructed photographing mode.

If the switching between the normal photographing mode and the trimming photographing mode is instructed by instructing means, driving control means performs the following operations ① and ②.

① To set the finder magnification to a magnification corresponding to the instructed photographing mode by driving the conversion lens via the first driving mechanism with the forward rotation of the motor.

② To set the illuminating angle of electronic flash device to an illuminating angle corresponding to the instructed photographing mode by driving the illuminating angle altering member via the second driving mechanism with the reverse rotation of the motor.

That is, the alteration for the finder magnification and the illuminating angle can be made with the rotation of a single motor. Note that the above order of ① and ② can be reversed.

The present invention is applicable to a camera comprising a zoom lens for photography to be zooming driven electrically, a zoom finder whose finder magnification is altered by the zooming with the zoom lens for photography, and a zoom flash device whose illuminating angle is altered by the zooming with the zoom lens for photography. And the above-mentioned object can be accomplished by providing a conversion lens insertable into an optical path of a zoom finder to alter the finder magnification separately from the zooming of the zoom finder, an illuminating angle altering member insertable into a front plane on a lighting portion of the zoom flash device to alter the illuminating angle separately from the zooming of the zoom flash device, an operation member for instructing the switching between the normal photographing mode and the trimming photographing mode, and driving means for electrically inserting or retracting the conversion lens so as to obtain a finder magnification in accordance with the instructed photographing mode and the zooming state of the zoom lens for photography, and electrically inserting or retracting the illuminating angle altering member so as to obtain an illuminating angle in accordance with the instructed photographing mode and the zooming state of the zoom lens for photography, if the switching of the photographing mode is instructed.

If the switching of the photographing mode is instructed with an operation of the operation member, the driving means electrically drives the conversion lens to set the finder magnification in accordance with the instructed photographing mode and the zooming state of the zoom lens for photography, and electrically drives the illuminating angle altering member to set the illuminating angle in accordance with the instructed photographing mode and the zooming state of the zoom lens for photography.

BRIEF DESCRIPTION OF THE DRAWINGS

FIGS. 1A and 1B are elevation views of a camera in which a lighting portion is popped up.

FIG. 2 is an elevation view of the camera in which the lighting portion is in a down state.

DESCRIPTION OF THE PREFERRED EMBODIMENTS

One example of the present invention will be described with reference to FIGS. 1A to 3.

FIGS. 1A and 1B are elevational cross-section view of a camera according to the present invention. 1 is a camera body, 2 is a taking lens of bifocal lens type protruding from a front panel of the camera body, 3 is a cartridge chamber, 4 is an aperture, and 5 is an AF block. The taking lens 2 is switchable between a first focal length (e.g., 35 mm) and a second focal length (e.g., 70 mm) larger than the first focal length, its switching being made by the use of a changeover switch, not shown. That is, the taking lens 2 allows for the setting of two kinds of angles of view.

Figure 3:
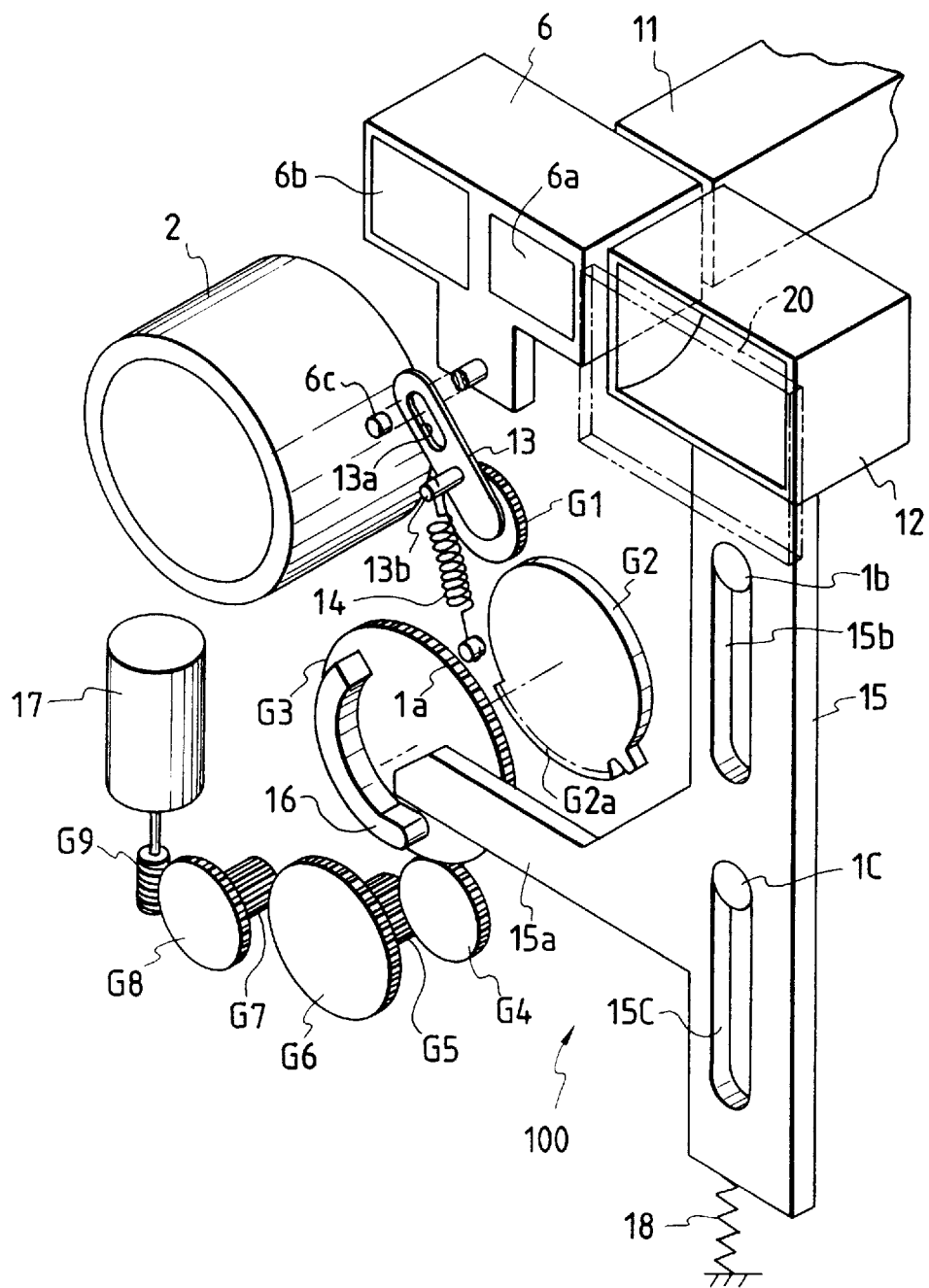
FIG. 3 is a view for illustrating a conversion lens and a driving mechanism of the lighting portion.

Also, 6 is a converter unit movable in a horizontal direction on a front panel of a finder 11 as shown in FIG. 3, 12 is a lighting portion of a pop-up type electronic flash device, the lighting portion 12 being switchable between a stored position (FIG. 2) where it is stored within the camera body 1 and a protruded position (FIG. 1A) where it is protruded from the camera body 1.

FIG. 3 shows a driving mechanism for the converter unit 6 and the lighting portion 12. The converter unit 6 has first and second conversion lenses 6a, 6b carried therein, which can be inserted and into (or retracted from) the front face of the finder 11, in which when the first conversion lens 6a is located in front of the finder 11, the finder magnification is set corresponding to a first focal length of the taking lens 2, while when the second conversion lens 6b is located in front of the finder 11, the finder magnification is set corresponding to a second focal length. A boss 6c protruded on a lower portion of the converter unit 6 engages a long hole 13a formed at one end of a lever 13, which is rotatable integrally with a gear G1 secured at the other end thereof. Also, a boss 13b protruded on the lever 13 and a boss 1a secured within the camera body 1 are connected with both ends of a toggle spring, whereby the lever 13 is urged in a counterclockwise direction in the state as shown in FIG. 1A, while it is urged in a clockwise direction in the state as shown in FIG. 1B.

G2 is a notched gear having a gear portion G2a matable with the gear G1, and G3 is a cam gear coaxial and integrally rotatable with the notched gear G2, a cam 16 fixed to the cam gear G3 being engageable with an arm portion 15a of a holder 15 which can move vertically. The holder 15 carries a lighting portion 12 of the electronic flash device as above described on its upper portion, and is formed with a pair of upper and lower long holes 15b, 15c, into which guide pins 1b, 1c fixed within the camera body 1 engages. The holder 15 is always urged downward in the figure by a strip 18. And if the cam 16 abuts the arm portion 15a with the rotation of the cam gear G3 in the counterclockwise direction, the holder 15 rises against a biasing force of the spring 18 while being guided by the pins 1b, 1c, so that the lighting portion 12 at the stored position is driven (pops up) to the protruded position. As the lighting portion 12 pops up, a space SP is formed within the camera body 1 (FIG. 1A).

20 is a diffusion plate provided on a front panel of the camera, this diffusion plate being located in front of the lighting portion 12 when the lighting portion 12 is located at the stored position. At this time, the illuminating light from the lighting portion 12 is diffused at the diffusion plate 20, its illuminating angle substantially coinciding with an angle of view in the first focal length. On the other hand, when the lighting portion 12 is at the protruded position, its illuminating angle is smaller than above described because the illuminating light from the lighting portion 12 does not pass through the diffusion plate 20, substantially coinciding with an angle of view in the second focal length.

Further, the cam gear G3 is mated with an idle gear G4 and then reduction gears G5 to G8 in succession, and a gear G8 is mated with a worm G9 mounted on an output shaft of the motor 17.

Next, the operation of example will be described.

FIG. 2 shows a state where the taking lens is set at the first focal length (e.g., 35 mm), the first conversion lens 6a being inserted into the optical path of the finder 11 on the front panel thereof, and the lighting portion 12 being at the stored position. Accordingly, in this state, the finder magnification corresponding to the first focal length (first angle of view) has been set, in which the whole of an object within that angle of view can be observed through the finder 11. If the flash photographing is made, the illuminating light from the lighting portion 12 is diffused at the diffusion plate 20 to illuminate an object within the angle of view. Note that as the converter unit 6 is urged via the lever 13 to the left in the figure by the toggle spring 14 at this time, it is held in a state as shown not to move to the right.

If a changeover switch not shown is operated in the state as shown in FIG. 2, the taking lens 2 is set at the second focal length (e.g., 70 mm), and the motor is rotated in a predetermined direction, its rotation being transmitted via gears G8 to G4, so that the cam gear G3 is rotated in a counterclockwise direction, and the cam 16 abuts the arm portion 15a. Further, if the cam gear G3 is rotated, the cam 16 pops up the holder 15 via the arm portion 15a, whereby the holder 15 is driven upward while being guided by guide pins 1b, 1c, and the lighting portion 12 of the electronic flash device is driven to the protruded position as shown in FIG. 1A (pop up). Thereby, a space SP is formed between the conversion lens 6a and the holder 15.

Along with the rotation of the cam gear G3, the notched gear G2 is integrally rotated, and after the pop-up of the lighting portion 12 has been completed, the gear portion G2a starts to be mated with the gear G1. Thereby, the gear G1 is rotated in a clockwise direction, causing the lever to be rotated integrally in the same direction. With the rotation of the lever 13, the converter unit 6 moves to the right in the figure because of the mating condition between the long hole 13a and the boss 6c, so that the conversion lens 6b is moved into the above space SP as shown in FIG. 1B, and inserted into the front face of the finder 11. Here, after the lighting portion 12 has been completely popped up, the cam 16 slides on the arm portion 15a of the holder 15 with the rotation of the cam gear G3, so that no positional change of the holder or the lighting portion 12 occurs.

If the converter unit 6 is moved up to a position where the switching between the conversion lenses 6a, 6b is completed, a switch not shown is turned on by the converter unit 6, which caused the motor 17 to be stopped. Note that the converter unit 6 is urged via the lever 13 to the right in the figure by the toggle spring 14 at this time, so that it is held in the state as shown not to move to the left.

In this state, the finder magnification corresponding to the second focal length (second angle of view) has been set by the conversion lens 6b, whereby the whole of an object within that angle of view can be observed through the finder 11. The illuminating angle for the lighting portion 12 is smaller than above described, as the diffusion plate 20 is not located in front of the lighting portion 12, so that at the flash photographing, an object within the second angle of view is only illuminated.

As above described, in switching from the first focal length to the second focal length, the conversion lens 6a is retracted into the space SP within the camera body 1 to be formed as the lighting portion 12 pops up, and the finder magnification corresponding to the second focal length can be obtained by the conversion lens 6b, so that the camera can be made smaller than if the conversion lens is retracted without regard to the lighting portion 12.

In the above instance, two conversion lenses 6a, 6b are provided corresponding to first and second focal lengths, respectively, but the conversion lens may be single. That is, for example, it is also permitted to provide the finder magnification corresponding to the second focal length without the conversion lens, and that corresponding to the first focal length by the insertion of the conversion lens. Also, the electronic flash device may be one of emitting the light only when the lighting portion pops up.

Further, an electronic flash device of which the lighting portion pops up upward of the camera was exemplified, but the lighting portion may pop up sideway of the camera. Further, a camera in which different angle of view can be obtained by changing the focal length of the taking lens was described, but the angle of view may be varied by making the trimming photography in which a predetermined trimming region in the film exposure region is only specified for the print.

According to the present invention, using a pop-up type electronic flash device, the conversion lens for the alteration of finder magnification is retracted into a space within the camera body formed when the electronic flash device is switched to the protruded position, so that the smaller camera can be obtained.

Figure 4:
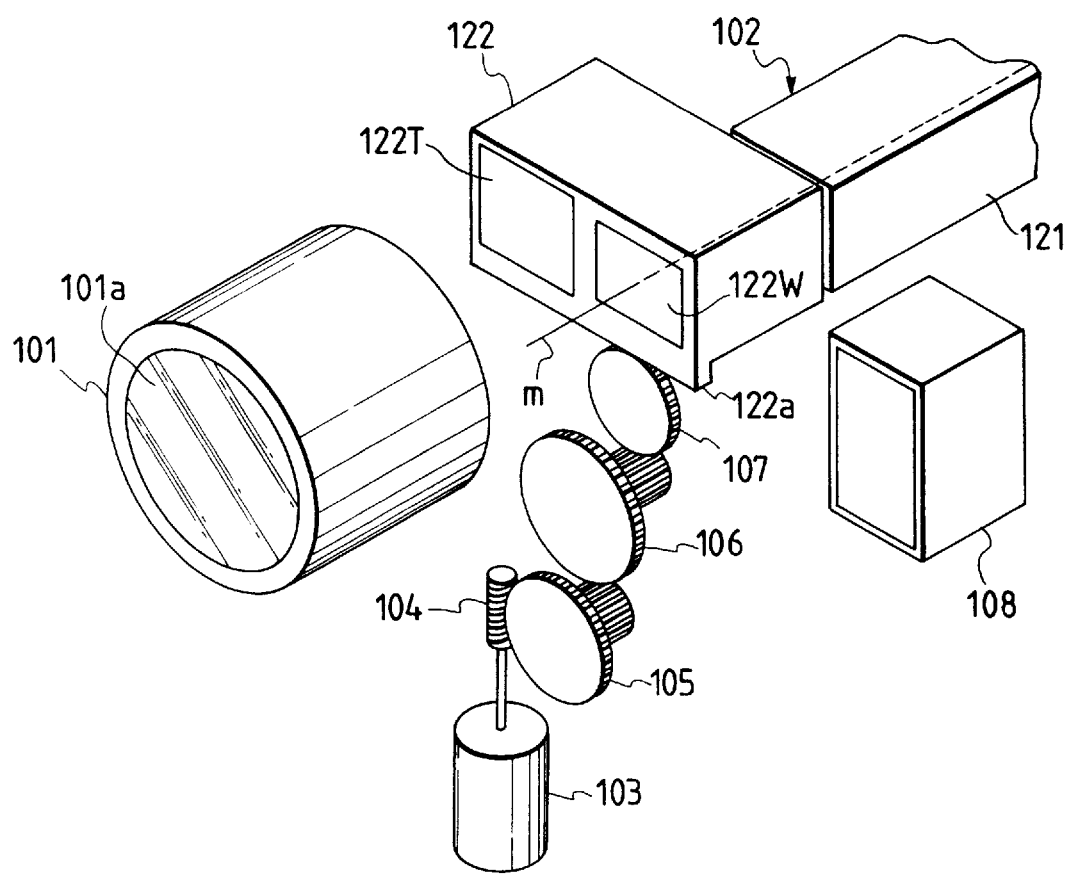
FIG. 4 is a perspective view of a camera with variable finder magnification in one example of the present invention.
Figure 5:
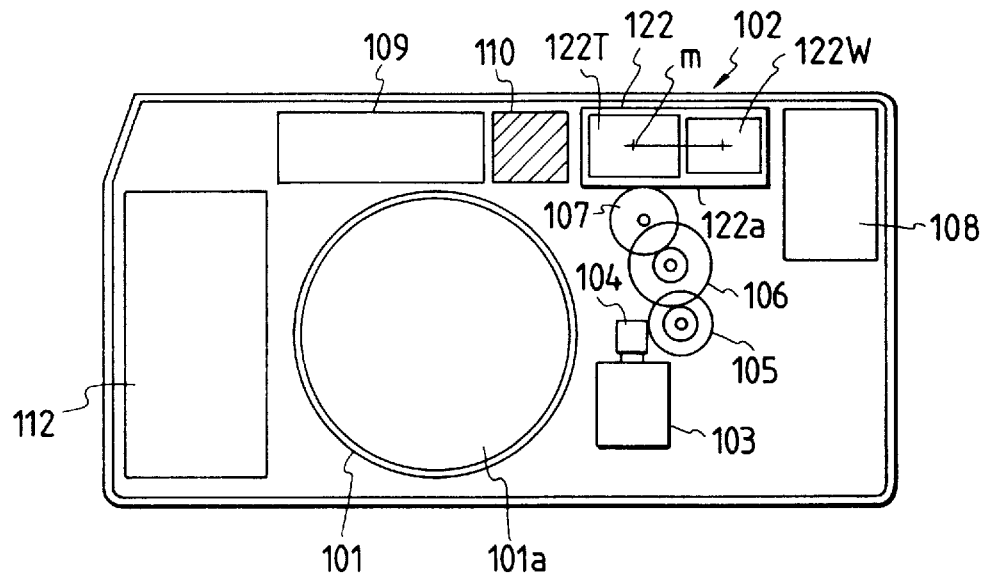
FIG. 5 is an elevation view of the camera as illustrated in FIG. 4, at the long focus photographing.

Referring now to FIGS. 4 and 5, a bifocal lens camera to which the present invention is applied will be described by way of an example.

In both figures, 101 is a lens-barrel projecting rotatably from the camera body, and 102 is a finder, in which a taking lens 101a contained within the lens-barrel 101 is switchable to either a long focal length or a short focal length. The finder 102 has a finder optical unit 121, and a converter lens block 122 switchable horizontally which is located in front thereof. If a focus changeover switch, not shown, is switched to the long focus side, the taking lens 101a is changed to the long focus, and the driving motor 103 is forwardly rotated, whereby its rotational driving force is transmitted via worm 104, gears 105, 106, 107 to a rack 122a of the converter lens block 122, thereby causing the converter lens block 122 to be switched to the long focus side. At this time, a tele-converter lens 122T contained within the converter lens block 122 becomes coaxial with an optical axis m of the finder optical unit 121. If the focus changeover switch is switched to the short focus side, the taking lens 101a is changed to the short focus, and the 20 driving motor 103 is reversely rotated, whereby the converter lens block 122 is switched to the short focus side. At this time, a wide converter lens 122W contained within the converter lens block 122 becomes coaxial with the optical axis m.

108 is a strobe unit of rectangular parallelepiped shape, disposed on one side of the converter lens block 122. The longitudinal direction of the strobe unit 108 is perpendicular to a switching direction or horizontal direction of the converter lens block 122. If the converter lens block 122 is switched to the long focus side, a first space 110 within the camera body is formed between the converter lens block 122 and an AF lock 109, as particularly shown in FIG. 5, while if it is switched to the short focus side, a second space 111 is formed between the converter lens block 122 and the strobe unit 108, as particularly shown in FIG. 6. Here, the AF unit 109 is one containing a light projecting portion and a light receiving portion in a so-called active range finding method. Note that 112 is a cartridge chamber.

Figure 6:
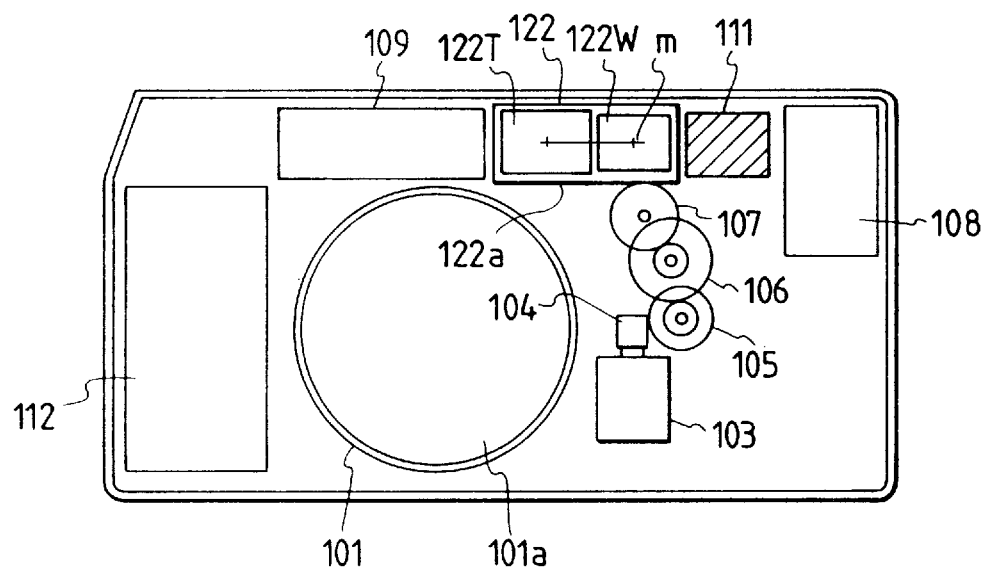
FIG. 6 is an elevation view of the camera as illustrated in FIG. 4 at the short focus photographing.

As above described, if the taking lens is switched to the long focus, the converter lens block 122 protrudes on the second space 111 side, as shown in FIG. 5, while if the taking lens 101a is switched to the short focus, the converter lens block 122 protrudes on the first space 110 side, as shown in FIG. 6.

Here, if the strobe unit 108 is disposed with its longitudinal direction being the horizontal direction of camera, the width in the horizontal direction of camera becomes larger. However, as the longitudinal direction of the strobe unit 108 is perpendicular to the switching direction or horizontal direction of the converter lens block 122 in this example, the size of the camera in the horizontal direction can be reduced by the amount (long side–short side) of the strobe unit 108.

While the above example was described with the bifocal lens camera, the present invention is similarly applicable to a so-called multifocal lens camera having more than two focuses or a camera having the zoom lens. Moreover, a camera with reduced size in the horizontal direction was described, but the present invention is also applicable to a camera with reduced size in the vertical direction.

With the above described constitution, the tele-converter lens 122T and the wide converter lens 122W constitute a plurality of converter lenses, and driving motor 103 constitutes magnification altering means, respectively.

According to the present invention, as the longitudinal direction of the strobe unit is substantially perpendicular to the switching direction of the converter lens block, it is possible to make smaller the size of camera having variable finder magnification when a strobe is built in.

Another example of the present invention will be described with reference to FIGS. 1A to 3.

Figure 12:
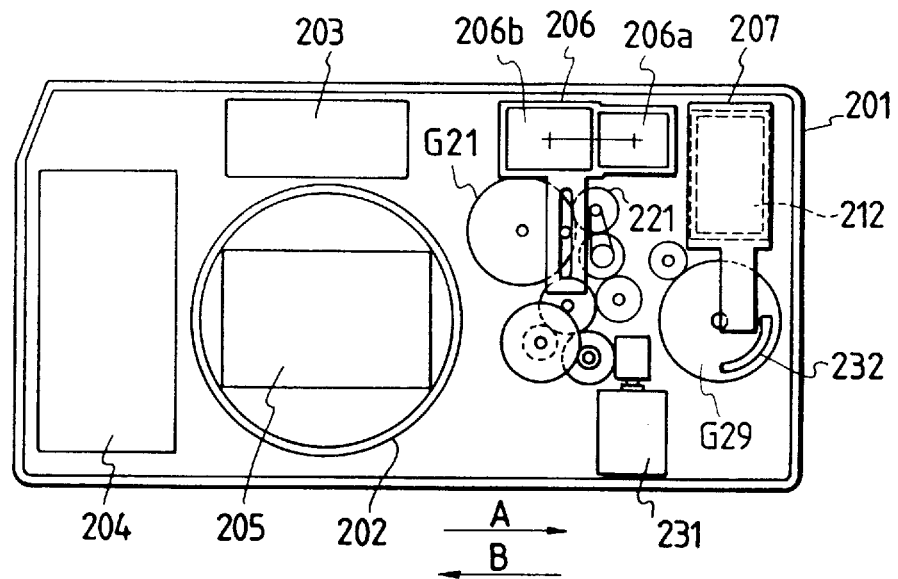
FIG. 12 is an elevation view illustrating a state during the switching.

FIG. 2 is an elevational cross-section view of a camera capable of the trimming photographing according to the present invention. 1 is a camera body, 2 is a taking lens of single focus protruding from the front panel of the camera body, 3 is a cartridge chamber, 4 is an aperture, and 5 is an AF block, 6 is a converter unit movable in a horizontal direction on the front panel of the finder 11 as shown in FIG. 3, and 12 is a lighting portion of a pop-up type electronic flash device. This camera is settable with a normal photographing mode for the normal photography and a trimming photographing mode for the trimming photography, in which the switching of both modes can be made with the operation of a mode changeover switch, not shown.

FIG. 3 shows a driving mechanism for the converter unit 6 and the lighting portion 12, in which the converter unit 6 has a converter lens 6a for the normal photographing and a converter lens 6b for the trimming photographing. A boss 6c projected on an under portion of the converter unit 6 engages a long hole 13a formed at one end of a lever 13, which is rotatable integrally with a gear G1 secured at the other end thereof. Also, a boss 13b projected on the lever 13 and a boss 1a secured within the camera body 1 are connected with both ends of a toggle spring, whereby the lever 13 is urged in a counterclockwise direction in a state as shown in FIG. 2, while it is urged in a clockwise direction in a state as shown in FIG. 1B.

G2 is a notched gear having a gear portion G2a matable with the gear G1, and G3 is a cam gear coaxial and integrally rotatable with the notched gear G2, a cam 16 fixed to the cam gear G3 being engageable with an arm portion 15a of a holder 15 which cam move vertically. The holder 15 has a lighting portion 12 of the electronic flash device as above described on its upper portion, and is formed with a pair of upper and lower long holes 15b, 15c, into which bosses 1b, 1c secured within the camera body 1 engages. The holder 15 is always urged downward in the figure by a spring 18. And if the cam 16 abuts and pops up the arm portion 15a with the rotation of the cam gear G3 in a counterclockwise direction, the holder 15 rises against a biasing force of the spring 18 while being guided by the pins 1b, 1c, so that the lighting portion 12 projects from an upper face of the camera body as shown in FIG. 1B (pop up).

20 is a diffusion plate provided on the front panel of the camera, this diffusion plate being located in front of the lighting portion 12 when the lighting portion 12 does not pop up (at a down state). At this time, the illuminating light from the lighting portion 12 is diffused at the diffusion plate 20, the whole of an object exposed to the film for photographing is illuminated. On the other hand, when the lighting portion 12 pops up, its illuminating angle is smaller than above described, as the illuminating light from the lighting portion 12 does not pass through the diffusion plate 20, so that an object corresponding to the trimming region in the exposed region of the film is only illuminated.

Further, the cam gear G3 is mated with an idle gear G4 and then reduction gears G5 to G8 in succession, and a gear G8 is mated with a worm G9 mounted on an output shaft of the motor 17.

Next, the operation of example will be described.

FIG. 2 shows a state at the normal photographing mode, in which the conversion lens 6a for normal photography is inserted into the optical path on the front panel of the finder 11, and the lighting portion 12 is at the down state. Accordingly, in this state, the finder magnification for normal photography has been set, whereby the whole of an object to be exposed to the film can be observed by the finder 11. If the flash photographing is made, the illuminating light from the lighting portion 12 is diffused at the diffusion plate 20, so that the whole of an object to be exposed to the film is illuminated. Note that the converter unit 6 is urged via the lever 13 to the left in the figure by the toggle spring 14 at this time, so that it is unlikely to move from that state.

If a mode changeover switch, not shown, is operated in the normal photographing mode to set the trimming photographing mode, the motor 17 is rotated in a predetermined direction, its rotation being transmitted via gears G9 to G4 in sequence, so that the cam gear G3 is rotated in a counterclockwise direction, and the cam 16 abuts the arm portion 15a. Further, if each gear G3 is rotated in the same direction, the cam 16 pops up the holder 15 via the arm portion 15a, in which the holder 15 is driven upward while being guided by guide pins 1b, 1c, causing the lighting portion 12 of the electronic flash device to pop up as shown in FIG. 1A. Thereby, a space SP is formed between the conversion lens 6a and the holder 15, as shown in the figure.

Along with the counterclockwise rotation of the cam gear G3, the notched gear G2 is integrally rotated, and after the pop-up of the lighting portion 12 has been completed, the gear portion G2a starts to be mated with the gear G1. Thereby, the gear G1 is rotated in the clockwise direction, causing the lever 13 to be rotated integrally in the same direction. With the rotation of the lever 13, the converter unit 6 moves to the right in the figure because of the mating condition between the long hole 13a and the boss 6c, the conversion lens 6b being moved into the above space SP as shown in FIG. 1B, and inserted into the front face of the finder 11. Here, after the lighting portion 12 has completely popped up, the cam 16 slides on the arm portion 15a of the holder 15 with the rotation of the cam gear G3, so that the position of the holder 15 or the lighting portion 12 does not change. And if the converter unit 6 is moved up to a position where the switching of the conversion lenses 6a, 6b has been completed, a switch, not shown, is turned on by the converter unit 6, which causes the motor 17 to be stopped. Note that the converter unit 6 is urged via the lever 13 to the right in the figure by the toggle spring 14 at this time, and is unlikely to move from that state.

In the trimming photographing mode, the finder magnification for the trimming photographing is set by the conversion lens 6b, whereby only an object located in the trimming region among the object exposed to the film can be observed by the finder 11. In the flash photographing, the illuminating angle is smaller than in the normal photographing, as the illuminating light from the lighting portion 12 is radiated without the diffusion plate 20, whereby an object located in the trimming region is only illuminated. Further, in this case, the trimming information is recorded, for example, in a blank portion of the film, with the shutter release. This trimming information is read on the laboratory side as previously described, and based on that information, the trimming region is only enlarged and printed.

If the changeover switch is operated in the trimming photographing mode to set the normal photographing mode, the motor 17 is rotated in a reverse direction to that as above mentioned, causing the gear G2 (FIG. 3) to be rotated in the clockwise direction from the state of FIG. 1B. Thereby, the gear G1 is rotated in the counterclockwise direction, so that the converter unit 6 is moved to the left as shown with the rotation of the lever 13 in the same direction, in which the conversion lens 6b is retracted from the front face of the finder 11 and the conversion lens 6a is inserted. At this time, the cam gear G3 is rotated in the clockwise direction integrally with the gear G2, but initially the cam 16 slides on the arm portion 15a of the holder 15, whereby the position of the holder 15 or the lighting portion 12 does not change. And since an end portion of the cam 16 reaches the arm portion 15a after the conversion lens 6a is completely inserted into the front face of the finder 11 so as to form the space SP, the holder 15 is lowered under a biasing force of the spring 18, along with the rotation of the cam gear G3, so that the lighting portion 12 is down as shown in FIG. 2. If it is completely down, a switch, not shown, is turned on, and the motor 17 is stopped.

According to this, if the switching between the normal photographing mode and the trimming photographing mode is instructed with a changeover switch, the motor 17 is driven, the conversion lenses 6a, 6b and the lighting portion 12 are driven with the rotation of the motor 17 in one direction, and the finder magnification and the illuminating angle corresponding to the instructed photographing mode is set. Accordingly, the alteration of the finder magnification and the illuminating angle can be made more rapidly than if either one of the conversion lenses 6a, 6b and the lighting portion 12 can be driven with the forward rotation of the motor, and the other can be driven with the reverse rotation.

With the above constitution of the example, the diffusion plate 20 constitutes the illuminating angle altering member, and the gears G1 to G9, the lever 13 and the cam 16 constitute the driving mechanism 100.

With the above constitution, using a pop-up type electronic flash device, the illuminating angle is altered, with the diffusion plate fixed, by moving the lighting portion 12 of the electronic flash device, but conversely, the illuminating angle may be altered, with the lighting portion fixed, by driving the diffusion plate. Also, in place of the diffusion plate, a condenser lens having the opposite action may be provided such that it is not used in the normal photographing mode, but used in the trimming photographing mode. Further, the driving of the converter unit, and the relative driving of the lighting portion and the illuminating angle altering member (diffusion plate or condenser lens), may be performed at the same time.

Further, with the above example, two conversion lenses 6a, 6b were provided, but the conversion may be single. That is, in this case, for example, the finder can be constituted so that the finder magnification in the normal photographing mode may be obtained without the conversion lens, and the finder magnification in the trimming photographing mode may be obtained by the insertion of the conversion lens. Conversely, the finder magnification in the trimming photographing may be obtained without the conversion lens, and the finder magnification in the normal photographing may be obtained by the insertion of the conversion lens.

Next, a further example of the present invention will be described with reference to FIG. 7.

Figure 7:
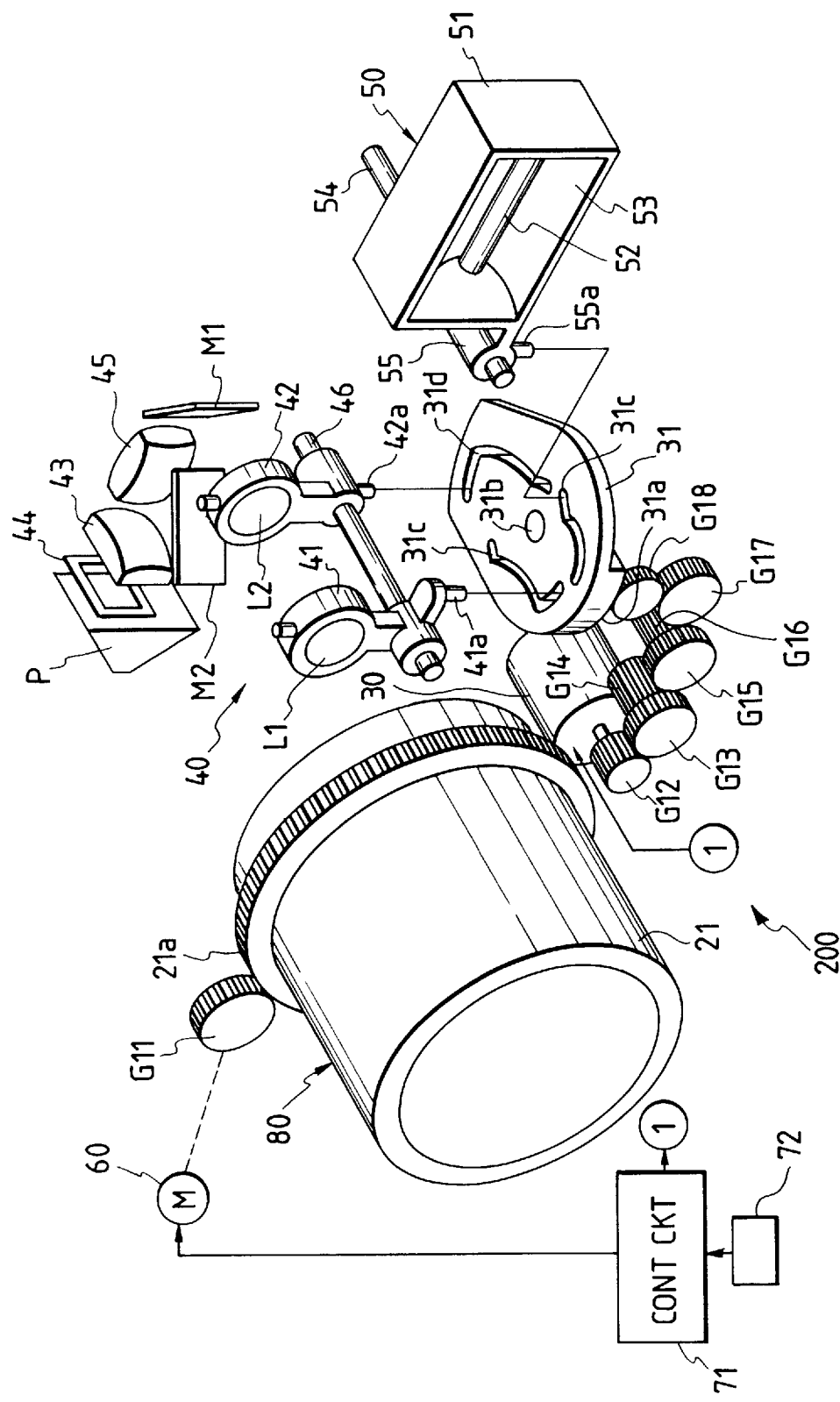
FIG. 7 is a perspective view of the camera for illustrating essential parts thereof in another example of the present invention.

FIG. 7 is a perspective view of a camera having a zoom lens for photographing and capable of the trimming photography. 21 is a zoom annulus constituting the zoom lens 80, within which a zoom optical system (not shown) is stored. A gear portion 21a formed on an external periphery of this zoom annulus 21 is mated with a gear G11, whereby the zoom annulus is rotated with the rotation of the gear G11 by the zooming motor 60, and in accordance with the rotation amount, the focal length of the zoom optical system or the angle of view is changed. Here, the zoom lens 80 in this example has a variable focal length in a range from 35 mm to 70 mm.

30 is a motor for finder zooming, in which the rotation of the motor 30 is transmitted via the gears G12 to G18 in succession to a crown gear 31a of the cam 31, which is then rotated around a shaft 31b with the rotation of the gear G18. The cam 31 is formed with three cam holes 31c, 31d, 31e, which are moved along with the rotation of the cam 31.

40 is a zoom finder, consisting of an inversion optical system having a pair of objective lenses L1, L2 carried on lens holders 41, 42, respectively, mirrors M1, M2, and a prism P, a field lens 43, a field frame 44, and an eye piece 45. The light of an object incident from the objective lens L1 passes through the objective lens L2 to be reflected at the mirror M1, which reflected light passes through the field lens 43, the field frame 44 and the prism P to be reflected at the mirror M2, and observed with the eye piece 45.

The lens holders 41, 42 are supported on a guide rod 46 to be slidable in the forward and backward directions (optical axis direction of objective lenses L1, L2), in which cam followers 41a, 42a engage cam holes 31c, 31d of the cam 31, respectively. Accordingly, as the cam holes 31c, 31d are moved with the rotation of the cam 31, the holders 41, 42 are moved along the guide rod 46, thereby causing the distance between objective lenses L1, L2 to be varied and the finder magnification to be altered.

With the camera of this example, the normal photographing mode and the trimming photographing mode with a trimming magnification of 1.7 are selectable. As the settable focal length range with the zoom lens 80 is from 35 mm to 70 mm, the equivalent focal length is variable in a range from 35 mm to 120 mm (70×1.7)mm. Thus, with the zooming of the objective lenses L1, L2, the finder magnification is variable in a range corresponding to the focal length of 35 mm to 120 mm.

50 is a lighting portion of the electronic flash device, which has a flash lamp 52 contained within a case 51, and a reflector 53, and a slider portion 55 formed integrally with the case 51 is slidable in the forward and backward directions (optical axis direction of the lighting portion 50) with respect to the guide shaft 54. A cam follower 55a embedded into the slide portion 55 engages a cam hole 31e, in which as the cam hole 31e is moved with the rotation of the cam 31, the lighting portion 50 slides along the guide rod 54, allowing the illuminating angle of the lighting portion 50 to be altered.

71 is a control circuit, and 72 is a zoom switch for instructing the alteration of the angle of view, in which the control circuit 71 controls the driving for the motors 30, 60, as will be described later, in response to an instruction signal from the zoom switch 72, as well as the switching of the photographing mode to set a predetermined angle of view.

Next, the operation of the example will be described.

If the zoom switch 72 is operated in the normal photographing mode, the control circuit 71 causes the zooming motor to be rotated in a predetermined direction. With its rotation, the zoom annulus is caused to rotate via the gear G11, whereby the zoom optical system, not shown, is driven to vary the focal length of the zoom lens, causing the angle of view to be changed. More particularly, when a wide side of the zoom switch 72 is depressed, the zoom lens 80 is driven to the wide side, resulting in a smaller focal length, while when a telephoto side of the zoom switch 72 is depressed, it is driven to the telephoto side, resulting in a larger focal length.

Also, the control circuit 71 causes the motor 30 to be rotated concurrently with the zooming motor 60, with the operation of the zoom switch 72, in which its rotation is transmitted via the gears G12 to G18 to the cam 31, which is then rotated. As the cam holes 31c, 31d are moved with the rotation of the cam 31, the lens holders 41, 42 are driven along the guide rod 46, and the zooming of the objective lenses L1, L2 is made, so that the finder magnification is set in accordance with the focal length of the taking lens 80. Further, as the cam hole 31e is moved with the rotation of the cam 31, the lighting portion 50 moves along the guide rod 54 in the forward and backward directions, so that the illuminating angle is set in accordance with the focal length of the taking lens.

On the other hand, if the telephoto side of the zoom switch 72 is still continuously depressed after the focal length of the zoom lens 80 reaches 70 mm (telephoto end), the control circuit 71 causes the motor 60 to drive the zoom lens 80 to the wide side, as well as setting the trimming photographing mode, and stops it when the focal length of 41 mm is obtained. As the trimming magnification is 1.7 in this example, the equivalent focal length of 70 (41×1.7) mm can be artificially obtained at a focal length of 41 mm. Thereafter, if the telephoto side of the zoom switch 72 is continuously depressed, the zoom lens 80 is driven to the telephoto side, in which the focal length is increased from 41 mm, and accordingly, the equivalent focal length is increased from 70 mm. And the equivalent focal length up to about 120 (70×1.7) mm can be set.

As above described, when the alteration of the angle of view is made beyond the angle of view which can be set in the focal length range (35 mm to 70 mm) settable with the zoom lens 80 for photographing, it is necessary to set the trimming photographing mode and zoom the focal length of the zoom lens 80 down to 41 mm, upon the focal length for the zoom lens 80 reaching 70 mm, whereby the alteration of the angle of view becomes discontinuous at the time of zooming down.

On the contrary, the zoom finder 40 is settable at the finder magnification corresponding to 35 mm to 120 mm in zooming, and the zooming of the finder 40 is performed separately from the zooming of the zoom lens 80 for photographing, so that the finder magnification corresponding to the equivalent focal length can be set more quickly than if a desired equivalent focal length is set. Accordingly, the photographer can make the adjustment for the composition by viewing through the finder 40 even if a desired angle of view has not been set, and the desired angle of view can be obtained when the composition is determined, so that the photographing can be made without losing a photo opportunity.

With the above constitution of the example, the zoom switch 72 constitutes instructing means, the control circuit 71 constitutes driving control means, and the control circuit 71, the gears G12 to G18 and the cam 31 constitute a finder zooming mechanism.

Note that the focal length range for the zoom lens 80 is not limited to 35 mm to 70 mm, and the trimming magnification is not limited to 1.7. Also, the zooming mechanism for the finder 40 is not limited to that shown in FIG. 7.

According to the present invention, the driving of the conversion lens, along with the relative driving between the illuminating angle altering member and the lighting portion of the electronic flash device, can be made with the rotation of the motor in one direction, so that the finder magnification corresponding to the instructed photographing mode, and the illuminating angle corresponding to the instructed photographing mode are set, whereby the switching between the finder magnification and the illuminating angle can be made more quickly, and the photographing can be made without losing a photo opportunity.

According to the present invention, a desired finder magnification is set by zooming driving the zoom finder with a finder magnification altering motor separately provided from the zooming motor for the zoom lens for photographing, in which when the alteration of angle of view is made beyond the angle of view which can be set in the focal length range (35 mm to 70 mm) settable with the zoom lens 80 for photographing, the finder magnification can be obtained more quickly than the angle of view is obtained. Accordingly, the adjustment of the composition can be made rapidly, and the desired angle of view can be obtained when the composition is determined, so that the photographing can be made without losing a photo opportunity.

One example of the present invention will be described with reference to FIGS. 8 to 16.

Figure 8:
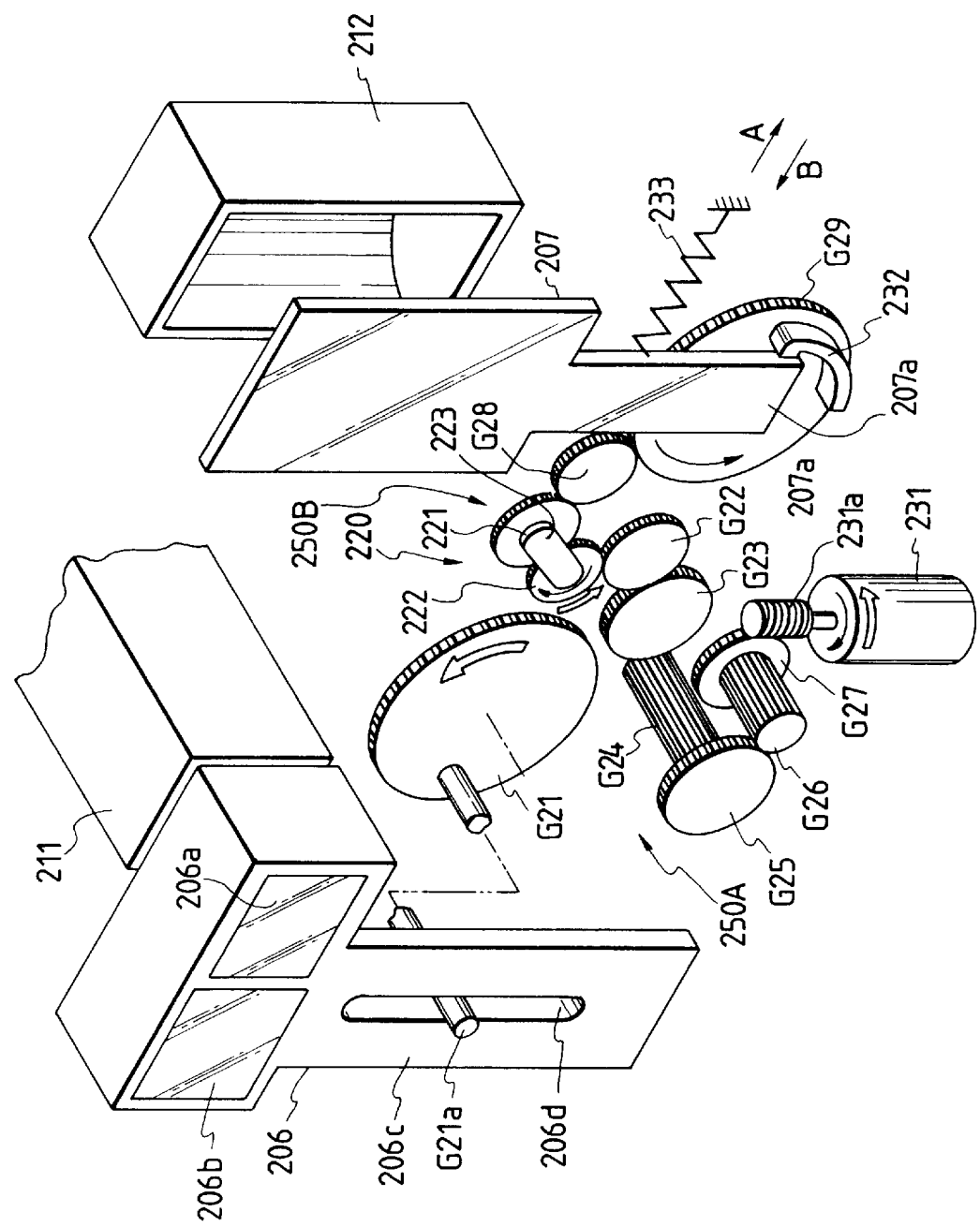
FIG. 8 is a perspective view of the camera for illustrating essential parts thereof in one example of the present invention.
Figure 9:
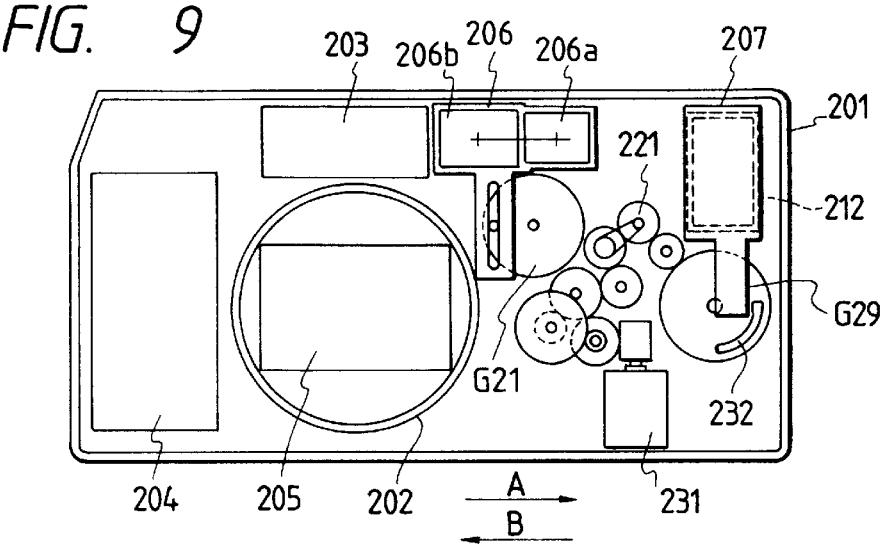
FIG. 9 is an elevation view of the camera in a state where the normal photographing mode is set.

FIG. 9 is an elevational cross-section view of a camera capable of the trimming photography according to the present invention. 201 is a camera body, 202 is a taking lens of single focus protruding from a front panel of the camera body, 203 is an AF device, 204 is a cartridge chamber, and 205 is an aperture. 206 is a converter unit for changing the magnification of the finder, and 207 is a diffusion plate for altering the illuminating angle of the electronic flash device. The converter unit 206 and the diffusion plate 207 are controlled and driven by a driving mechanism as particularly shown in FIG. 8.

In FIG. 8, 211 is a finder optical system disposed immediately behind the converter unit 206, and 212 is a lighting portion of the electronic flash device, in which the converter unit 206 has a conversion lens 206*a* for the normal photography and a conversion lens 206*b* for the trimming photography. A boss G21*a* protruded on the gear G21 is engaged into a long hole 206*d* provided on a leg portion 206*c* of the converter unit 206, and as the boss G21*a* is moved with rotation of the gear G21 in a counterclockwise direction, the converter unit 206 is moved in a transverse direction of the camera between a position shown in FIG. 9 and a position shown in FIG. 12.

In FIG. 9, the conversion lens 206*a* is located in front of the finder 211, in which the finder magnification for the normal photography (substantially corresponding to an entire exposure region of one frame of film) can be obtained. In FIG. 12, the conversion lens 206*b* is located in front of the finder 211, in which the finder magnification for the trimming photography (corresponding to a predetermined trimming region among the exposure region of one frame of film) can be obtained.

A gear G21 is mated with a planet gear 221 constituting a sun and planet gear 220. The sun and planet gear 220 consists of the planet gear 221 and a sun gear 222, both gears 221, 222 being mated and interconnected with each other via an arm 223. The sun gear 222 is connected via idle gears G22, G23 and reduction gears G24 to G27 in succession to a worm gear 231*a* mounted on an output shaft of the motor 231, the sun gear 222 being rotated in the clockwise direction with the clockwise rotation of the motor 231 as shown, and in the counterclockwise direction with the counterclockwise rotation of the motor 231. And with the rotation of the sun gear 222 in the counterclockwise direction, a lever 223 is swung in the same direction, causing the planet gear 221 to be mated with the gear G21, while with the rotation of the sun gear 222 in the clockwise direction, the lever 223 is swung in the same direction, causing the planet gear 221 to be mated with an idle gear G28.

The idle gear G28 is mated with a cam gear G29 having a cam 232 secured thereto, the cam 232 being rotated integrally with the rotation of the cam gear G29 in the counterclockwise direction. 207 is a diffusion plate as above described, which is urged by a spring 233 in a direction of A as shown in the figure, its leg portion 207*a* and the cam 232 being engageable with each other. That is, if the cam gear G29 is rotated in the counterclockwise direction, an end portion of the cam 232 abuts the leg portion 207*a* of the diffusion plate 207, causing the diffusion plate 207 to be moved in a direction of B against a biasing force of the spring 233. Thereby, the diffusion plate 207 is movable in a transverse direction of the camera between a position shown in FIG. 9 and a position shown in FIG. 10.

Figure 10:
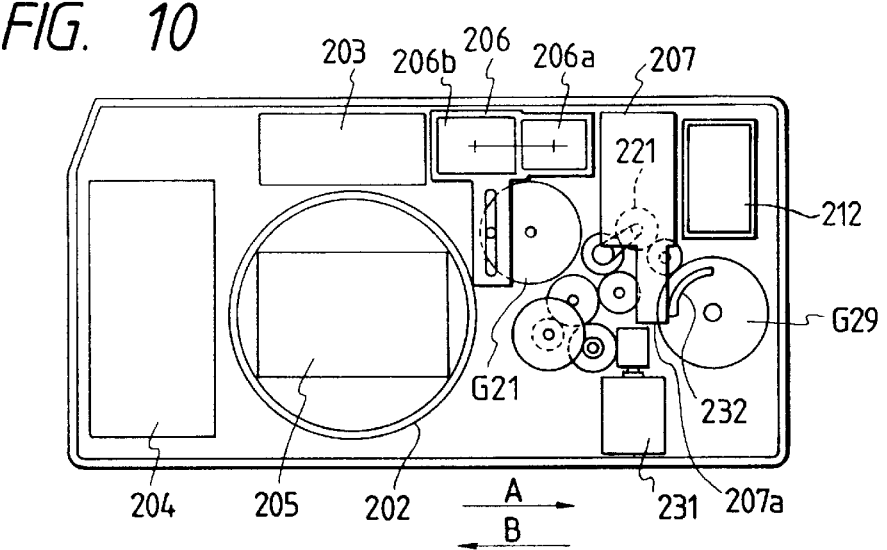
FIG. 10 is an elevation view of the camera in a state where the spot flash photographing mode is set.

In FIG. 9, as the diffusion plate 207 is located in front of the lighting portion 212, the light from the lighting portion is diffused at the diffusion plate 207, its illuminating angle being an angle for the normal photography by which the full exposure region of one frame is covered. In FIG. 10, as the diffusion plate 207 is retracted from the front face of the lighting portion 212, the light from the lighting portion 212 is not diffused, its illuminating angle being an angle for the trimming photography (less than the angle for the normal photography) by which the trimming region of the above-mentioned exposure region is only covered.

Figure 14:
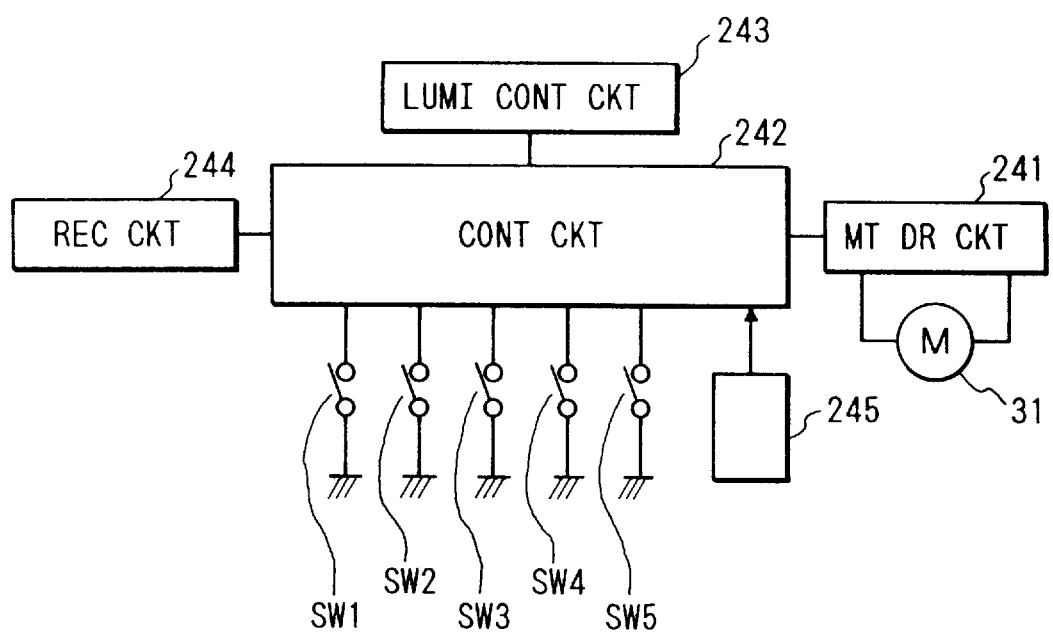
FIG. 14 is a block diagram of a control system.

FIG. 14 illustrates a control system of the camera. 241 is a motor drive circuit for the motor 231 as above described, this motor drive circuit 241 being connected to a control circuit 242. The control circuit 242 is connected to switches SW1 to SW5, and a mode changeover button 245, as well as being connected to a luminescence control circuit 243 of the electronic flash device and a recording circuit 244. The luminescence control circuit 243 controls the luminescence of the lighting unit 212 in response to an instruction from the control circuit 242. The recording circuit 244 records the trimming information on, for example, a blank portion of the film, upon the shutter release, at the trimming photographing mode.

A switch SW2 is a normal photographing detection switch which is turned on upon the movement of the converter unit 206 to a position at which the conversion lens 206a for the normal photography is inserted into the front face of the finder 211, and a switch SW3 is a trimming detection switch which is turned on upon the movement of the converter unit 206 to a position at which the conversion lens 206b for the trimming photography is inserted into the front face of the finder 211. A switch SW4 is an insertion detection switch which is turned on upon the movement of the diffusion plate 207 to a position at which it is inserted into the front face of the lighting portion 212, and a switch SW5 is a retraction detection switch which is turned on upon the movement of the diffusion plate 207 to a position at which it is retracted from the front face of the lighting portion 212. Further, a switch SW1 is a main switch.

In this example, the normal photographing mode and the trimming photographing mode are settable, and further the spot photographing mode is settable. This spot flash photographing mode will be described later.

Figure 15:
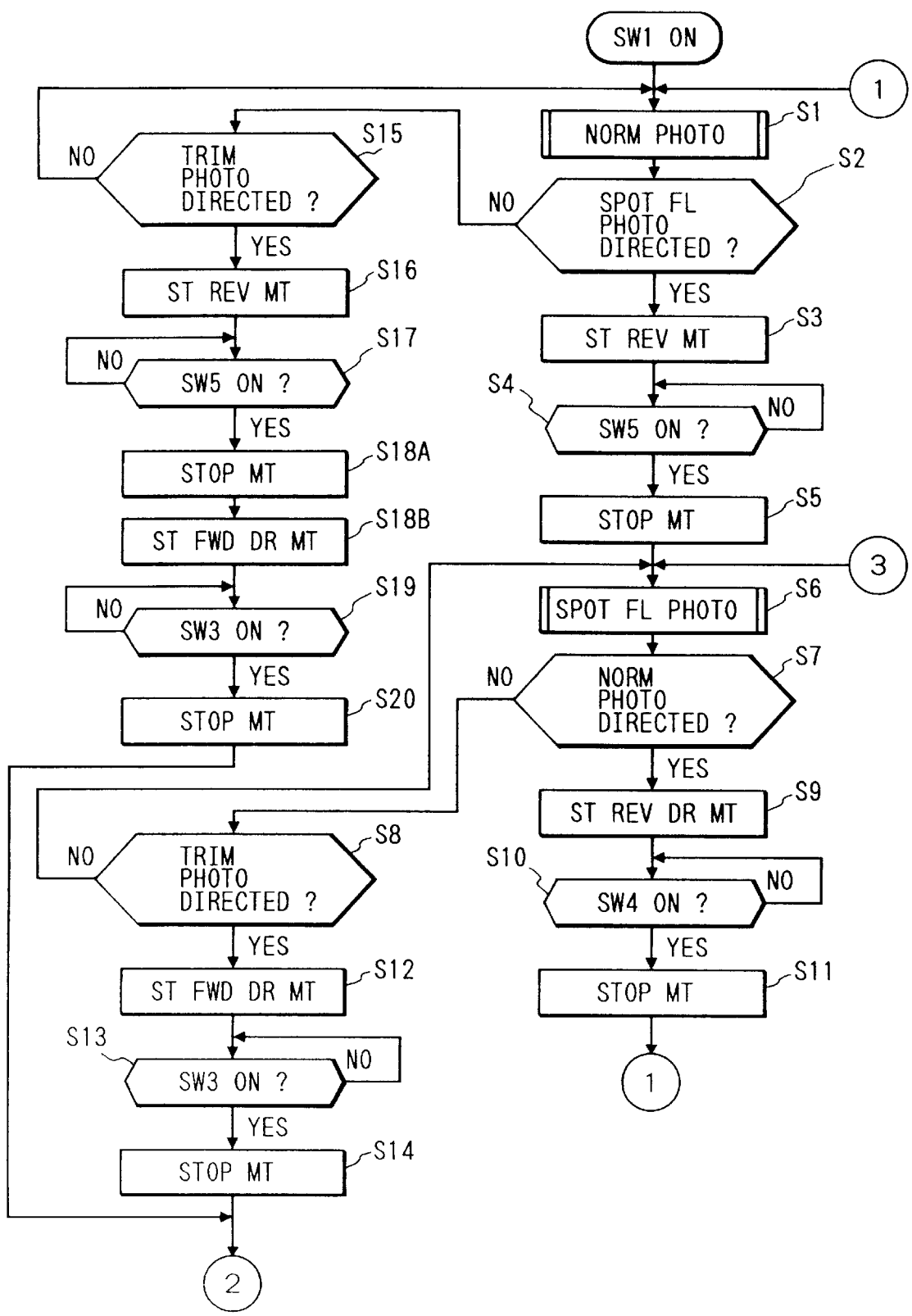
FIG. 15 is a flowchart of an operation procedure.
Figure 16:
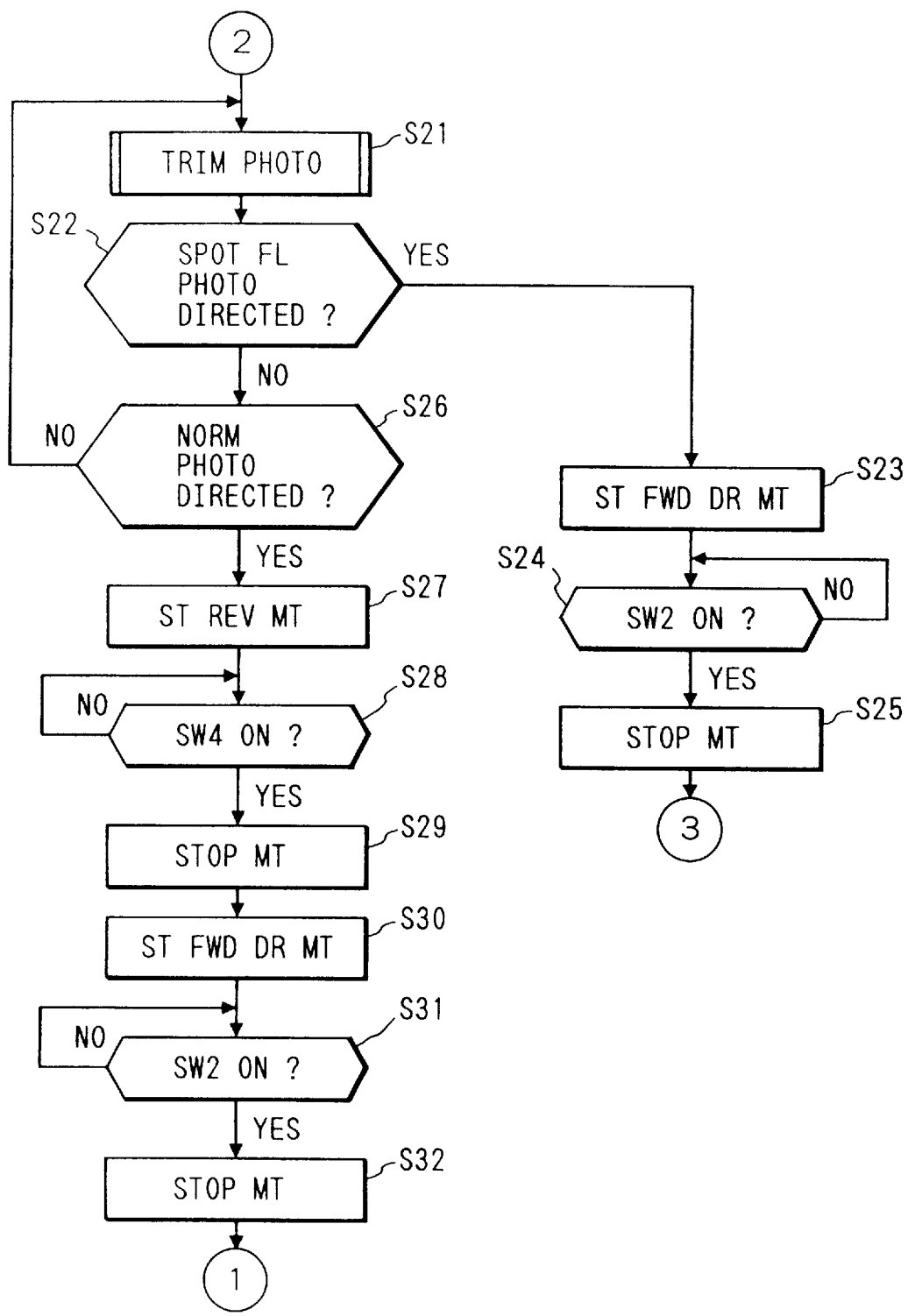
FIG. 16 is a flowchart continued from FIG. 15.

Next, the operation of example will be described with reference to flowcharts as shown in FIGS. 15 and 16.

If the main switch SW1 is turned on, a program of FIGS. 15 and 16 is started. In this example, if the main switch SW1 is turned off, the operation is reset to the normal photographing mode (state of FIG. 9), and accordingly, it follows that when the main switch SW1 is on, the operation is always in the normal photographing mode. In the normal photographing mode, the conversion lens for the normal photography is located in front of the finder as shown in FIGS. 8 and 9, whereby a normal finder magnification is set. At this time, the diffusion plate 207 has been inserted into the front face of the lighting portion 212 of the electronic flash device, whereby an illuminating angle for the normal photography is set.

Accordingly, at step S1 of FIG. 15, the normal photography is made. That is, when a release button, not shown, is turned on, photographing members (such as a diaphragm and a shutter) are driven, and an object image is exposed on a film. At this time, the lighting portion of the electronic flash device is caused to emit the light via the luminescence control circuit 243, as necessary, in which its emitted light illuminates the whole of an object to be observed via the diffusion plate 207 through the finder 211. Note that in this normal photography, the recording of the trimming information is not made. If the release button is not turned on, the step S1 is skipped.

Next, if the spot flash photographing mode is instructed with the operation of a mode changeover button 245, the routine proceeds to step S3, where the reverse rotation of the motor 231 (rotation in a clockwise direction) is started. The rotation of the motor 231 is transmitted via the gears G27, G26, G25, G24, G23 and G22 in succession to the sun gear 222 constituting an epicyclic gear 220, the sun gear 222 being rotated in the clockwise direction. Thereby, the lever 223 is swung in the clockwise direction so that the planet gear 221 is mated with the gear G28, in which the rotation of the sun gear 222 causes the cam gear G29 to be rotated in a counterclockwise direction via the planet gear 221 and the gear G28. Thereby, as an end portion of the cam 232 abuts a leg portion of the diffusion plate 207, the diffusion plate 207 is moved in a direction of B as indicated in FIG. 8 against a biasing force of the spring 233. If the cam gear G29 is rotated about 180°, the diffusion plate 207 is completely retracted from the front face of the lighting portion 212 as shown in FIG. 10, upon which a diffusion plate retreat switch SW5 is turned on, the step S4 is affirmed, and the motor 231 is stopped at step S5. Thereby, the spot flash photographing mode is set as shown in FIG. 10.

At step S6, the spot flash photographing is made with the luminescence of the lighting portion 212 of the electronic flash device. As the diffusion plate 207 is retracted and the illuminating angle for the trimming photography is set up to this time, a part of an object observed through the finder 211 (which is set at a finder magnification for the normal photography at this time) corresponding to the trimming region is only illuminated. Also, the recording of the trimming information is not made, so that the object over the entire exposure area of the film is printed in a laboratory. As a result, a fancy photograph having a central portion of image only illuminated like a spot can be obtained.

At step S7, a determination is made whether or not the normal photographing mode is instructed with the operation of a mode changeover button 245, and at step S8, a determination is also made whether or not the trimming photographing mode is instructed. If steps S7 and S8 are both negated, the routine returns to step S6, while if the step S7 is affirmed, that is, the normal photographing mode is instructed in the spot flash photographing mode, the routine proceeds to step S9.

At step S9, the motor 231 is started to rotate reversely to set the normal photographing mode. Thereby, the cam gear G29 is further rotated from a state shown in FIG. 10 in the counterclockwise direction. At the early time of the rotation, the cam 232 only slides on an end face of the leg portion 207a for the diffusion plate 207, with no movement of the diffusion plate 207, and if the cam 232 is completely retreated from the leg portion 207a with a further rotation, the diffusion plate 207 is moved in a direction of A with a biasing force of the spring 233, resulting in a state of FIG. 9, or a state where it is located in front of the lighting portion 212. As the diffusion plate insertion switch SW4 is then turned on, the step S10 is affirmed, and at step S11, the motor 231 is stopped.

On the other hand, if the step S7 is negated and the step S8 is affirmed, that is, the trimming photographing mode is instructed in the spot flash photographing mode, the routine proceeds to step S12, where the forward rotation of the motor 231 (rotation in the counterclockwise direction) is started. The rotation of the motor 231 causes the sun gear 222 of the epicyclic gear 220 to be rotated in the counterclockwise direction via gears G27, G26, G25, G24, G23 and G22 in succession. Thereby, the lever 223 is swung in the counterclockwise direction, so that the planet gear 221 is separated from the gear G28 and mated with the gear G21, and the rotation of the sun gear 222 causes the gear G21 to be rotated in the counterclockwise direction via the planet gear 221.

Figure 13:
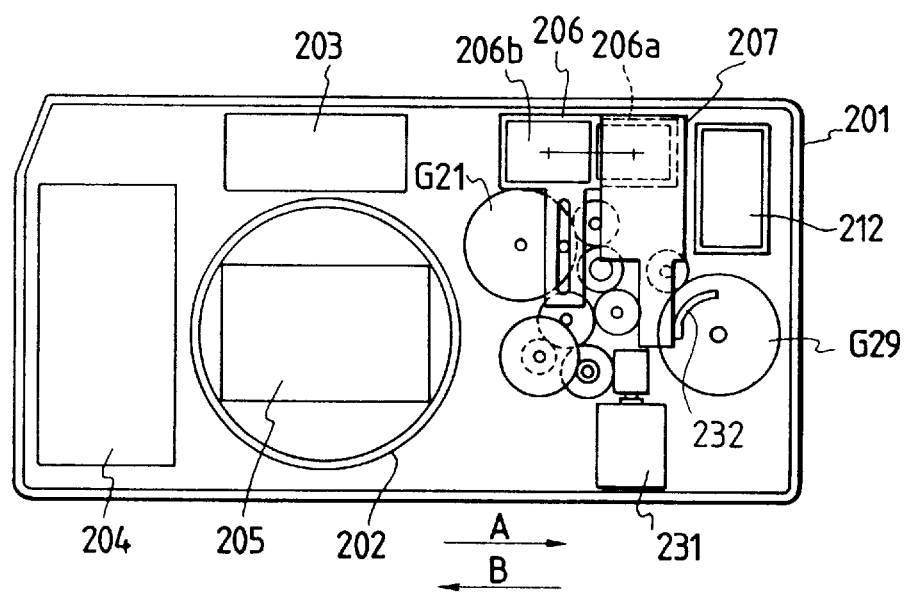
FIG. 13 is an elevation view of the camera in a state where the trimming photographing mode is set.

Along with the rotation of the gear G21, a boss G21a is rotated, causing the converter unit 206 to move in a direction of A as indicated in FIG. 8 via a long hole 206d. If the gear G21 is rotated about 180°, it is in a state as shown in FIG. 13, in which the conversion lens 206b for the trimming photography is located in front of the finder 211. As the trimming detection switch SW is then turned on, the step S13 is affirmed, the motor 231 is stopped at step S14, and the routine proceeds to step S21 as shown in FIG. 16. Thereby, the trimming photographing mode can be set.

Figure 11:
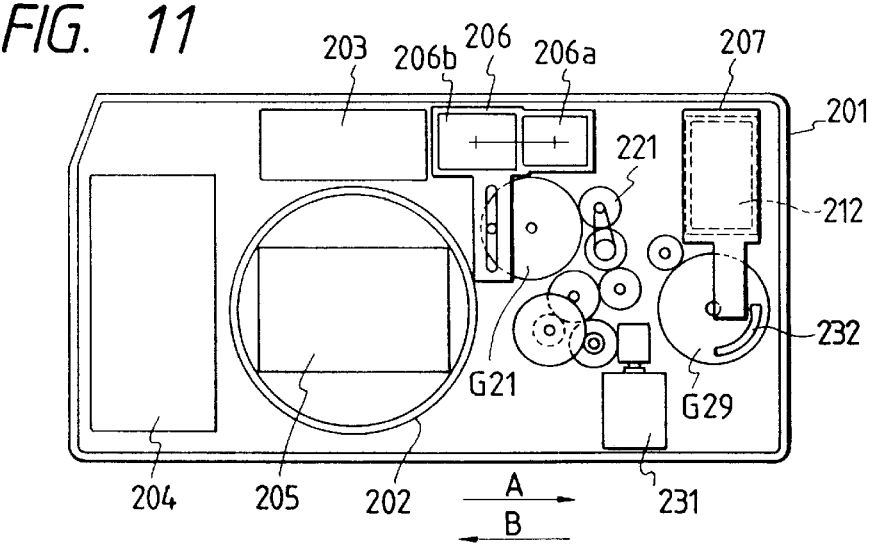
FIG. 11 is an elevation view illustrating a state during the switching.

On the other hand, if the step S2 is negated, the routine proceeds to step S15. At step S15, a determination is made whether or not the trimming photographing mode is directed. If it is negated, the routine returns to step S1, while it is affirmed, that is, the trimming photographing mode is directed in the normal photographing mode (FIG. 9), the reverse rotation of the motor 231 is started at step S16. Thereby, the diffusion plate 207 is retracted from the front face of the lighting portion 212 in the same way as above described, and if it is fully retracted, the diffusion plate retraction switch SW5 is turned on, whereby the step S17 is affirmed, and the routine proceeds to step S18A. At step S18A, the motor 231 is stopped, and then rotated in a forward direction at step S18B. Thereby, the planet gear 221 is mated with the gear G21 as shown in FIG. 11, and the conversion lens is switched from 206a to 206b, in the same way as above described, and after the completion of switching, the trimming detection switch SW3 is turned on, whereby the step S19 is affirmed, and the motor 231 is stopped at step S20. Thereby, the trimming photographing mode is set as shown in FIG. 13, and then the processing goes to step S21 of FIG. 16.

At step S21 of FIG. 16, the trimming photographing is made. That is, if the release button, not shown, is turned on in the same way as above described, photographing members (such as a diaphragm and a shutter) are driven to expose an object image on a film, as well as transferring the trimming information to a blank portion of the film by activating the recording circuit 244. Also, at the photographing time, the lighting portion 212 of the electronic flash device is caused to emit the light via the luminescence control circuit 243 as necessary, in which its emitted light can illuminate only a part of the object corresponding to the trimming region because the diffusion plate has been retracted. Here, the trimming information as above recorded is read on the laboratory side, and based on that information, the trimming region is only printed.

Next, if the step S22 is affirmed, that is, the spot flash photographing mode is directed in the trimming photographing mode, the forward rotation of the motor 231 is started at step S23. Thereby, the gear G21 is rotated in the counterclockwise direction from the state of FIG. 13, the converter unit 206 is driven in a direction of B with the rotation of the boss G21a, and the conversion lens is switched from 206b to 206a. Upon the completion of switching, the normal photographing detection switch SW202 is turned on, whereby the step S24 is affirmed, and the motor 231 is stopped at step S25. Then the processing goes to step S6 of FIG. 15.

On the other hand, if the step S22 is negated, and then the step S26 is negated, the routine returns to step S21, while if the step S26 is affirmed, that is, the normal photographing mode is directed in the trimming photographing mode, the routine goes to step S27. At step S27, the reverse rotation of the motor is started. Thereby, the cam gear G29 is rotated in the counterclockwise direction from the state of FIG. 13, and if the cam 232 is separated from the diffusion plate 207, the diffusion plate 207 is moved in a direction of A, with the biasing force of the spring 233, to the front face of the lighting portion 212. Then, as the diffusion plate insertion switch SW4 is turned on, the step S28 is affirmed, and the motor 231 is stopped at step S29. At step S30, the motor 231 is forwardly rotated. Thereby, the planet gear 221 is mated with the gear G21, as shown in FIG. 12, which is then rotated in the counterclockwise direction, causing the boss G21a to move so as to change the conversion lens 206a to that for the normal photography. If completely changed (state of FIG. 9), the normal photographing detection switch SW2 is turned on, whereby the step S31 is affirmed, and the motor 231 is stopped at step S32.

Since the switching of the conversion lenses 206a, 206b and the insertion and retraction of the diffusion plate 207 are allowed with the forward and reverse rotation of a single motor as above described, the camera can be made smaller, and the cost can be reduced, as compared with the case where the switchings of the finder magnification and the illuminating angle are performed by respective dedicated motors. Also, the spot flash photographing mode can be set as above described, so that a fancy photograph can be taken.

With the constitution of the above example, the diffusion plate 207 constitutes the illuminating angle altering member, the gears G21 to G27, the epicyclic gear 220 and the boss G21a constitute a first driving mechanism 250A, the gears G22 to G29, the epicyclic gear 220, the cam 232 and the spring 233 constitute a second driving mechanism 250B, the motor changeover button 245 constitutes directing means, and control means and a motor driving circuit 241 constitute driving control means.

Note that a condenser lens may be used, instead of the diffusion plate, so that it is retracted from the front face of the lighting portion at the normal photographing mode, and inserted thereinto at the trimming photographing mode. The conversion lens may be sufficient with at least one. And with the tele-conversion lens, it is retracted at the normal photographing mode, and inserted at the trimming photographing mode, while with the wide conversion lens, it is inserted at the normal photographing mode, and retracted at the trimming photographing mode. Furthermore, in the above constitution, it is assumed that the counterclockwise rotation of the motor 231 is a forward rotation, and the clockwise rotation is a reverse rotation, but it will be appreciated that the opposite definition may be permitted. Furthermore, the constitution of the first and second driving mechanisms is not limited to that of this example.

According to the present invention, the forward rotation of the single motor causes the conversion lenses to be switched, and the reverse rotation of the motor causes the illuminating angle altering member to be driven to alter the illuminating angle, so that it is possible to suppress the size of camera and the cost to the minimum.

Another example of the present invention will be described with reference to FIGS. 17 to 22.

Figure 19:
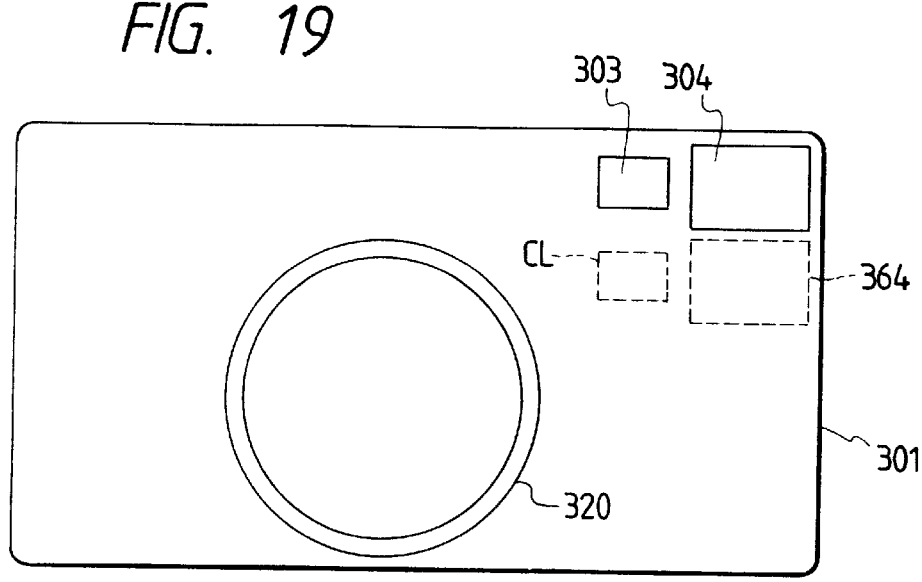
FIG. 19 is an elevation view of the camera.

FIG. 19 is an elevational view of a camera according to the present invention. 301 is a camera body, having a taking lens barrel (zoom lens barrel) 320, an objective window 303 of the finder and a lighting window 304 of the electronic flash device on a front panel thereof.

The camera of this example allows for the normal photography in which the print for the whole of a rectangular exposure region 390 on the film is directed and the trimming photography in which the print for only the trimming region 391 of the exposure region 390 is directed, the image magnification at the trimming photography being smaller than that at the normal photography. Here, the exposure region 390 is normally 24 mm longitudinally, and 36 mm transversely, and assuming that the longitudinal dimension of the trimming region 391 is A and the transverse dimension is B, 24/A=36/B stands.

Figure 17:
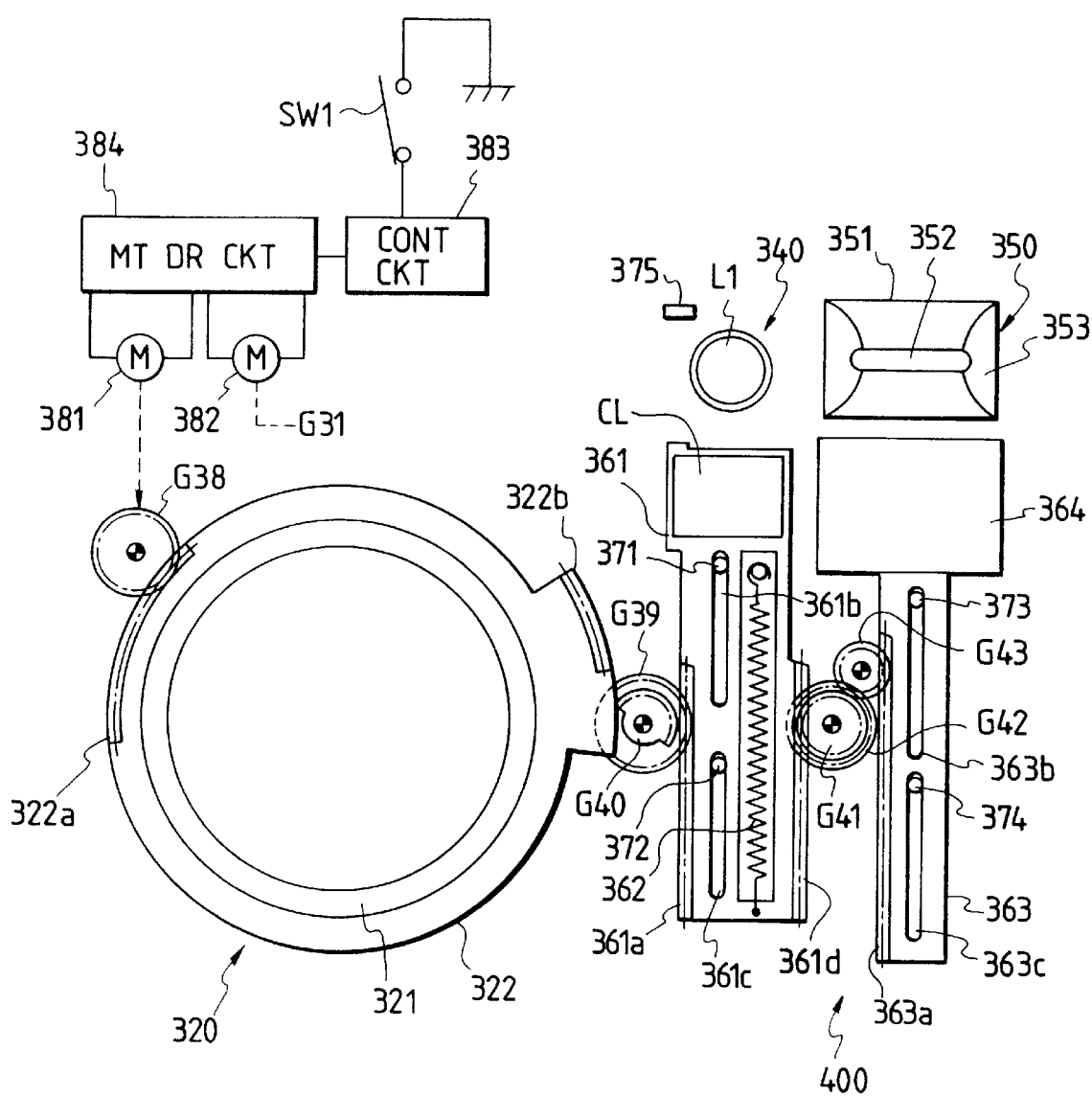
FIG. 17 is a view for illustrating a conversion lens and a condenser lens driving mechanism of a camera in one example of the present invention.

The switching between the normal photographing mode for the normal photography and the trimming photographing mode for the trimming photography is directed with the operation of a mode changeover switch SW1 as shown in FIG. 17, in which at the trimming photographing mode, the trimming information corresponding to the exposure region 390 of each frame is recorded on, for example, a blank portion of the film. A variety of recording methods such as optical, electrical or magnetic methods can be devised. Also, the recording region is not limited to the blank portion of the film, but may be a predetermined recording area of cartridge, for example. The trimming information recorded is read on the laboratory side, and based on that information, the trimming region is only enlarged and printed. Note that the recording of information is not performed at the normal photographing mode.

Figure 18:
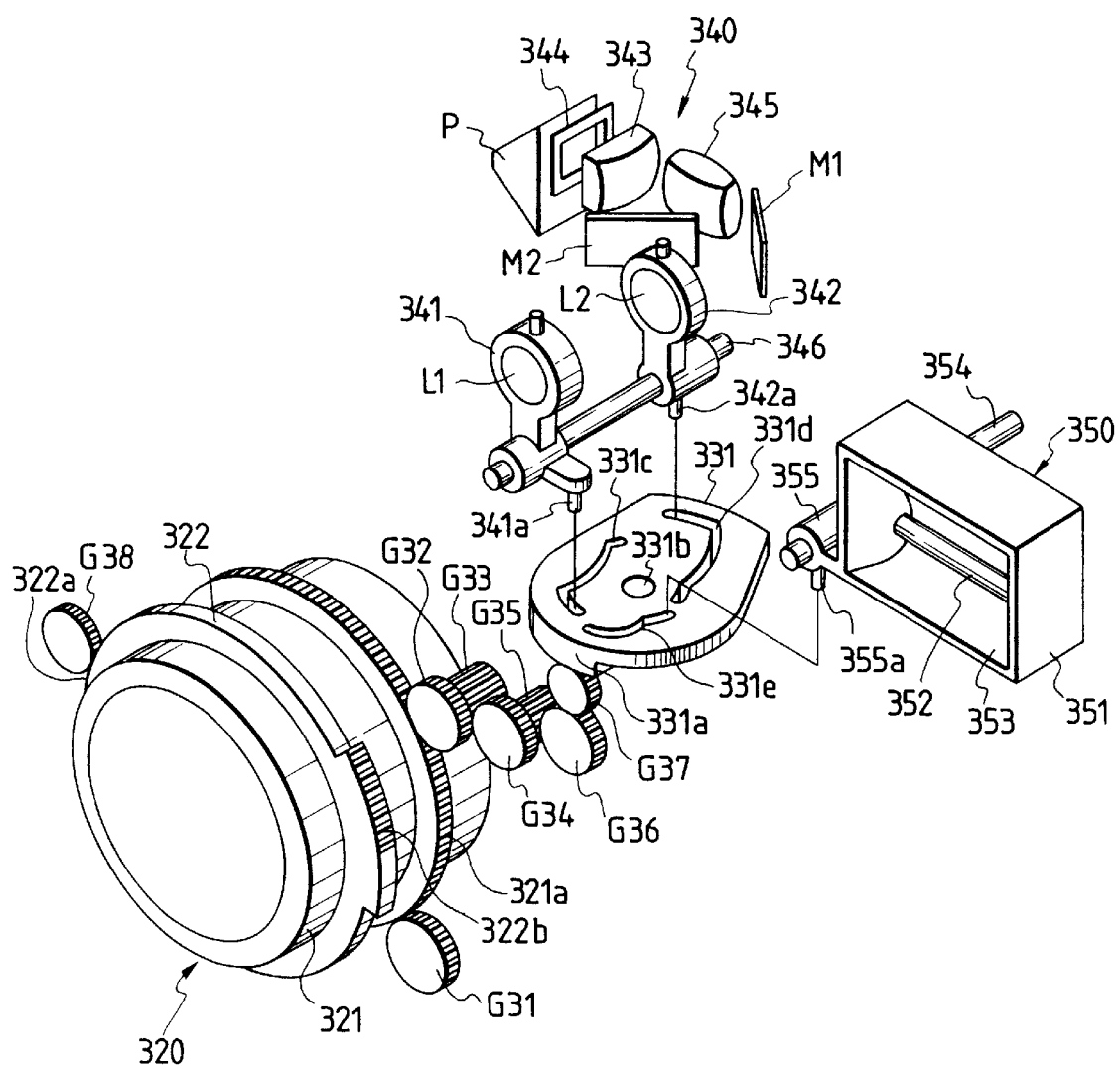
FIG. 18 is a view for illustrating a driving mechanism for a zoom finder and a zoom flash device of the camera.

FIG. 18 is a perspective view illustrating the constitution of the finder and the lighting portion of the electronic flash device for the above-mentioned camera. 321 is a zoom annulus constituting the taking lens barrel 320, within which a zoom optical system (not shown) is stored. A gear G31 is mated with the gear portion 321a formed on an external peripheral surface of this zoom annulus 321, which is then rotated with the rotation of the gear G31 by the zooming motor 382 (FIG. 17), and in accordance with the amount of its rotation, the focal length of the zoom optical system or the image magnification is changed. The rotation of the zoom annulus 321 is transmitted via the gear portion 321a and the gears G32 to G37 to a crown gear 331a of the cam 331, and with the rotation of the gear G37, the cam 331 is rotated around a shaft 331b. The cam 331 has three cam holes 331c, 331d and 331e formed, which are moved along with the rotation of the cam 331.

Figure 20A:
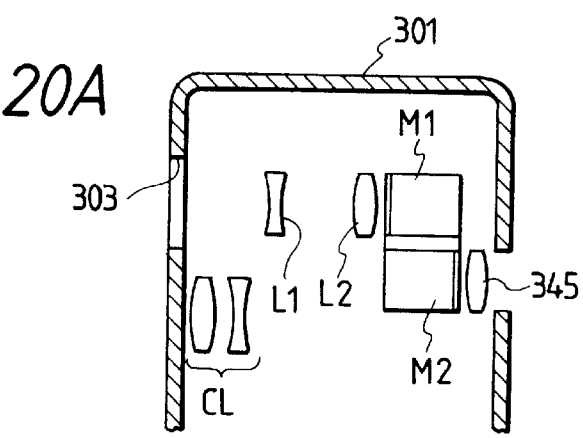
FIGS. 20A and 20B are views for illustrating the operation of conversion lens.
Figure 20B:
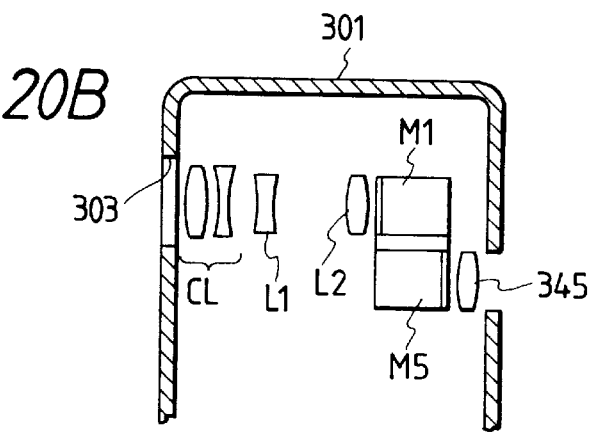

340 is a zoom finder, consisting of an inversion optical system having a pair of objective lenses L1, L2 carried on lens holders 341, 342, respectively, mirrors M1, M2, and a prism P, a field lens 343, a field frame 344, and an eye piece 345. As shown in FIGS. 20A and 20B, the objective lens L1 is opposed to the objective window 303, the light of an object from the objective window 303 is reflected through the lenses L1, L2 at the mirror M1, and its reflected light passes through the field lens 343, the field frame 344 and the prism P, and then is reflected at the mirror M2 to be observed with the eye piece 345.

The lens holders 341, 342 are supported on a guide rod 346 to be slidable in the forward and backward directions (optical axis direction of objective lenses L1, L2), in which cam followers 341a, 342a engage cam holes 331c, 331d of the cam 331, respectively. Accordingly, as the cam holes 331c, 331d are moved with the rotation of the cam 331, the holders 341, 342 are moved along the guide rod 346, thereby causing the distance between objective lenses L1, L2 to be varied and the finder magnification to be altered.

Figure 21A:
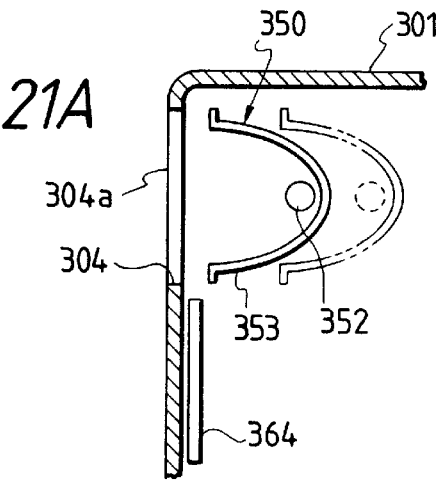
FIGS. 21A and 21B are views for illustrating the operation of condenser lens.
Figure 21B:
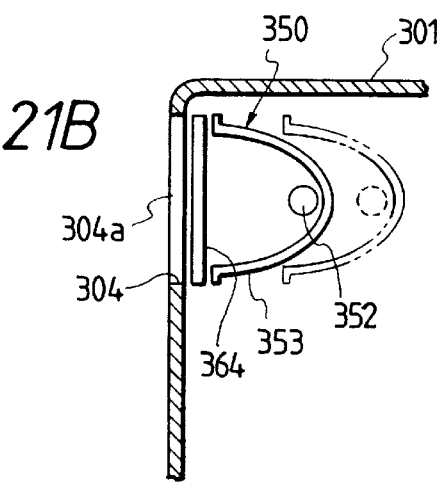
Figure 22:
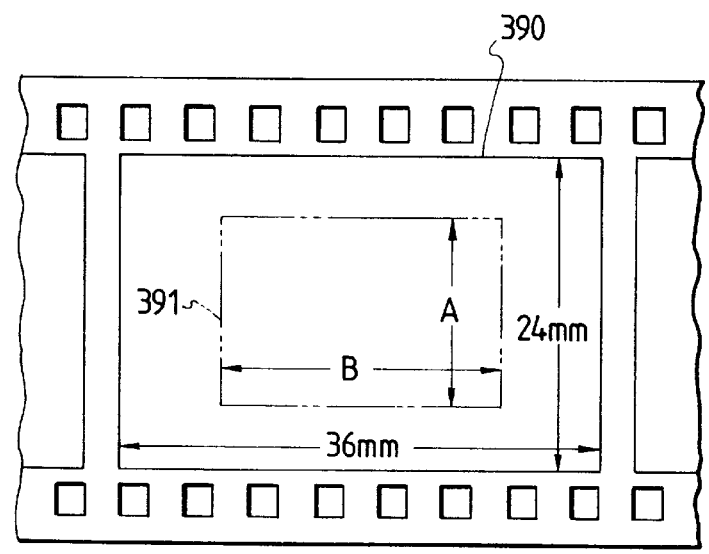
FIG. 22 is a view for illustrating an exposure region and a trimming region on the film.

350 is a lighting portion of electronic flash device, this lighting portion 350 having a flash lamp 352 contained within a case 351, and a reflector 353, and a slider portion 355 formed integrally with the case 351 is slidable in the forward and backward directions (optical axis direction of the lighting portion 350) with respect to the guide shaft 354. As shown in FIGS. 21A and 21B, the front face of the lighting portion 350 is opposed to a condenser lens 304a secured to the lighting window 304. A cam follower 355a embedded into the slide portion 355 of FIG. 18 engages a cam hole 331e of the cam 331, in which as the cam hole 331e moves with the rotation of the cam 331, the lighting portion 350 slides along the guide rod 354, allowing the illuminating angle of the lighting portion 350 to be altered.

Here, the cam holes 331c to 331e are formed such that the finder magnification and the illuminating angle are varied corresponding to the focal length of photographing zoom optical system, or the photographing magnification.

322 is a driving annulus rotatably fitted over the zoom annulus 321, and a gear G38 is mated with a gear portion 322a of this driving annulus 322 as shown in FIG. 17. The gear G38 is rotated by the motor 381, whereby the driving annulus 322 is rotated relative to the zoom annulus 321. The gear portion 322b of the driving annulus 322 is matable with a notched gear G40 integral with the gear G39, which is mated with one rack gear 361a of a lens holder 361.

The lens holder 361 is movable vertically, while carrying a conversion lens (tele-converter) CL on its upper portion, and is always urged upward by a spring 362. Also, the lens holder 361 is formed with a pair of long holes 361b, 361c in a longitudinal direction, which are engaged by guide pins 371, 372 secured to the camera body 301. Accordingly, the lens holder 361 is moved vertically, while being guided by the guide pins 371, 372, with the rotation of the gear G39, whereby the conversion lens is moved upward or downward to a position (FIG. 20A) where it is retracted from the optical path of the objective lens L1 or a position (FIG. 20B) where it is inserted into the optical path of the objective lens L1, between the objective lens L1 and the objective window 303 constituting the finder 340. And at the retracted position of FIG. 20A the finder magnification corresponds to that of the normal photographing, while at the inserted position, it corresponds to that of the trimming photographing.

A gear G41 of two speed gears G41, G42 integrally rotatable is mated with the other rack gear 361d of the lens holder 306, and a gear G42 is mated with a gear G43, which is mated with a rack gear 363a of the condenser lens holder 363. The holder 363 holds a condenser lens 364 on its upper portion, and is movable vertically, with a pair of long holes 363b, 363c formed on this holder 363 being engaged by guide pins 373, 374 secured to the camera body 301, respectively. Accordingly, the holder 363 is moved upward or downward, while being guided by the guide pins 373, 374, with the rotation of the gear G43, whereby the condenser lens 364 is moved upward or downward to a position (FIG. 21A) where it is retracted from the optical path of the lighting portion 350 or a position (FIG. 21B) where it is inserted into the optical path of the lighting portion 350, between the lighting portion 350 of the electronic flash device and the lighting window 304.

At the retracted position of FIG. 21A, the illuminating angle of the lighting portion 350 is an angle (by which the entire exposure region 390 is covered) corresponding to the normal photography, while at the inserted position of FIG. 21B, it is an angle (less than at the normal photography, by which the trimming region is covered) corresponding to the trimming photography. Here, a driving mechanism is constituted of the motor 381, the gears G38 to G43, the driving annulus 322 and the spring 362.

383 in FIG. 17 is a control circuit, to which is connected the motor driving circuit 384 for the motors 381, 382. The control circuit 383 controls the driving for the motor 381 with the operation of a mode changeover switch SW1, and controls the driving for the zooming motor 382 with the operation of a zooming switch, not shown.

Next, the operation of the example will be described.

(1) Operation in the normal photography

In this case, each member is placed in the state as shown in FIG. 17, the conversion lens CL and the condenser lens 364 are at the retracted positions as shown in FIGS. 20A and 21A, respectively. That is, the finder magnification and the illuminating angle for the normal photography are set. They are urged upward by a lens holder spring 362, but hold the indicated state because an end portion of the notched gear G40 is engaged by a projecting portion of the drive annulus 322 as shown in FIG. 17.

If the zooming switch is operated in this state, the control circuit 383 causes the zooming motor 382 to rotate in the forward direction (or reverse direction) via the motor drive circuit 384, whereby the zoom annulus 321 is rotated in a predetermined direction to zoom up (or zoom down) for the taking lens with the rotation of the zoom annulus 321. At this time, the cam 331 is rotated via the gears G32 to G37 and the crown 331a, with the rotation of the zoom annulus 321, and as the cam holes 331c, 331d move, the objective lenses L1, L2 are driven in an optical axis direction to make the zooming of the finder 340. Thereby the finder magnification is altered to a magnification (image magnification) corresponding to a focal length of the photographing zoom optical system. Also, as the cam hole 331e moves with the rotation of the cam 331, the lighting portion 350 of the electronic flash device is driven in its optical axis direction in synchronism with the objective lenses L1, L2, whereby the illuminating angle of the lighting portion 350 is altered to an angle corresponding to a focal length of the taking lens. Note that as the driving annulus 322 is not rotated, the insertion of conversion lens CL and condenser lens 364 is not performed.

(2) Operation in the trimming photography

If the trimming photography is directed with the operation of a mode changeover switch SW1, the control circuit 383 causes the motor 381 to rotate in a predetermined direction via the motor drive circuit 384, whereby the driving annulus 322 is rotated via the gear G38 in the clockwise direction as shown with respect to the zoom annulus 321, so that the gear portion 322b is mated with the notched gear G40, which is rotated integrally with the gear G39. With the rotation of the gear G39, the lens holder 361 is driven upward via the rack gear 361a, and the lens holder 363 is driven upward via the rack gear 363d, the gear G41 to G43 and the rack gear 363a in synchronism with the movement of the lens holder 361.

When the gear portion 322b is separated from the notched gear G40 with a further rotation of the driving annulus 322, an upper portion of the lens holder 361 is brought into contact with a stop, and the lens holder 361 is held at its position with a biasing force of the spring 362. At this time, the conversion lens CL has been inserted in the optical path of the objective lens L1 constituting the finder 340 as shown in FIG. 20B, and the condenser lens 364 has been inserted in the front panel of the lighting portion 350 as shown in FIG. 21B. Accordingly, the finder magnification and the illuminating angle for the trimming photography can be set.

As the zoom finder 340 and the lighting portion 350 are in the zooming state in accordance with the focal length of the zoom optical system in this case, the finder magnification and the illuminating angle, in accordance with the trimming photographing mode and the focal length for the taking lens, can be obtained with the insertion of the conversion lens CL and the condenser lens 364.

If the zooming switch is operated in this state, the zooming for the photographing zoom optical system, the zoom finder 340 and the lighting portion 350 perform in the same way as above described while the conversion lens CL and the condenser lens 364 are inserted, so that the finder magnification and the illuminating angle are those corresponding to the trimming photographing mode and the focal length for the taking lens, in the same way as above described.

Further, if the normal photographing mode is directed with the operation of the mode changeover switch SW1 in this state, the motor 381 rotates in a reverse direction to that as above described, causing the conversion lens CL and the condenser lens 364 to be retracted with the reverse operation as above described, whereby the finder magnification and the illuminating angle are set in accordance with the normal photographing mode and the focal length of the zoom optical system.

With the constitution of the above example, the condenser lens 364 constitutes the illuminating angle altering member, the mode changeover switch SW1 constitutes the operation member, and the driving mechanism 400 constitutes driving means.

In the above example, the insertion and retraction of the conversion lens CL and the condenser lens 364 are performed by a driving force of a single motor, but may be performed by separate motors. Also, the insertion and retraction mechanism for the conversion lens CL and the condenser lens 364 is not limited to that of the example. Further, in the above example, the tele-converter is used as the conversion lens CL, in which it is retracted from the optical path of the finder 340 at the normal photography, and inserted at the trimming photography, but conversely, the conversion lens CL may be a wide converter, in which it is inserted into the optical path of the finder 340 at the normal photography, and retracted at the trimming photography. Further, in the above example, the zoom finder is one in which the finder magnification is altered by the zooming of the objective lenses L1, L2, but may be one in which the finder magnification is altered by changing the size of the field frame made of liquid crystals for example. In this case, the operation of altering the size of the field frame corresponds to the zooming.

According to the present invention there are provided a conversion lens insertable into or retractable from the optical path of a zoom finder, and an illuminating angle altering member insertable into or retractable into or from the front face of the lighting portion of the zoom flash device, in which the insertion and retreat for the conversion lens and the illuminating angle altering member can be performed with the motor so that the finder magnification and the illuminating angle may be obtained corresponding to a photographing mode directed with the switching and the zooming state of photographing zoom lens, in accordance with a switching instruction of the photographing mode, whereby there is an effect that appropriate finder magnification and illuminating angle can be set in a shorter time, with a simple structure of a smaller size, and without requiring any special operations.

What is claimed is:

1. A camera in which either of a normal photographing mode and a trimming photographing mode is selectable, comprising:

a photographing zoom lens having a range of focal lengths between a wide angle end and a telephoto end; and a control system, including a zooming motor for driving the zoom lens, operable to set a focal length of said zoom lens in response to actuation of a control element, said control system operating in the following manner:

when a desired focal length is within said range, the normal photographing mode is selected and the zoom lens is driven to the desired focal length;

when a desired focal length is greater than the focal length at the telephoto end, the trimming photographing mode is selected, and the zoom lens is driven to the telephoto end, is then driven toward the wide angle end to a predetermined focal length at which a product of the predetermined focal length and a predetermined trimming magnification is equal to the focal length at the telephoto end, and is then again driven toward the telephoto end to a further focal length at which the product of the further focal length and the predetermined trimming magnification is equal to the desired focal length.

2. A camera according to claim 1 further comprising:

a zoom finder adjustable to set a finder magnification having an angle of view corresponding to the angle of view at the desired focal length; and a finder magnification adjusting motor separate from said zooming motor, said finder magnification adjusting motor being operated by said control system to adjust the finder magnification.

3. A method of operating a camera in which either of a normal photographing mode and a trimming photographing mode is selectable, the camera having a zoom lens with a range of focal lengths between a telephoto end and a wide angle end, said method comprising:

selecting a desired focal length; and when the desired focal length is within said range, selecting the normal photographing mode and driving the zoom lens to the desired focal length, when the desired focal length is greater than the focal length at the telephoto end, selecting the trimming photographing mode, driving the zoom lens to the telephoto end, then driving the zoom lens toward the wide angle end to a predetermined focal length at which a product of the predetermined focal length and a predetermined trimming magnification is equal to the focal length at the telephoto end, and then again driving the zoom lens toward the telephoto end to a further focal length at which the product of the further focal length and the predetermined trimming magnification is equal to the desired focal length.

* * * * *